Oct. 27, 1959   L. R. HARPER   2,910,236
CALCULATOR PROGRAM SYSTEM
Filed Jan. 15, 1954   12 Sheets-Sheet 6

FIG. 3

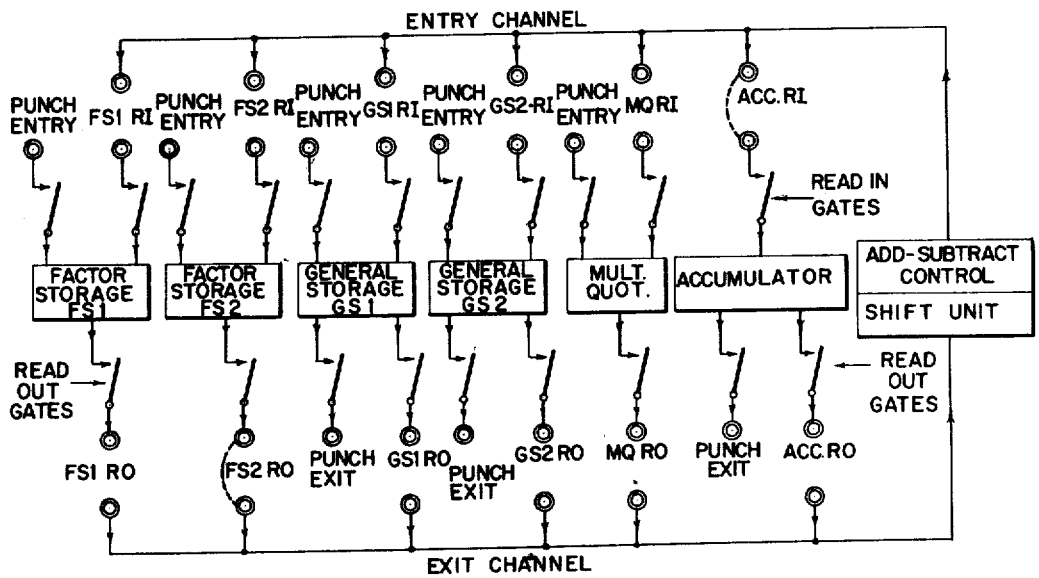

| | GROUP | | RESET 3A-8B | ADD SUBTRACT CONTROL 10A | TRANFER 11B-19B | CARRY 20B-1A | PROGRAM ADVANCE 2AB |
|---|---|---|---|---|---|---|---|
| NO SKIPPING | I | MULT.+(1st CYCLE)<br>MULT.-(1st CYCLE) }M-D(1st CYCLE)<br>DIV. (1st CYCLE) | X | X | X | X | |
| SKIP RESET | II | MULT.+(INT. CYCLE)<br>MULT.-(INT. CYCLE)<br>DIV. (INT CYCLE) | SKIP | X | X | X | |
| | III | MULT. (LAST CYCLE)<br>MULT. (LAST CYCLE)<br>DIV. (LAST CYCLE)<br>ACC. RI +<br>ACC. RI - | SKIP | X | X | X | X |
| SKIP CARRY | IV | FS RI (FS1, FS2 ETC.)<br>GS RI (GS1, GS2 ETC.) | X | X | X | SKIP | X |
| NO CONTROL | V | ACC. RO<br>ACC. RO AND RESET<br>FS RO (FS1, FS2 ETC.)<br>GS RO (GS1, GS2 ETC.)<br>MQ RO | | X | X | | X |

FIG. 4

INVENTOR
LEONARD R HARPER
BY
Murray Nones
ATTORNEY

Oct. 27, 1959 — L. R. HARPER — 2,910,236
CALCULATOR PROGRAM SYSTEM
Filed Jan. 15, 1954 — 12 Sheets-Sheet 7

INVENTOR
LEONARD R HARPER
BY Murray Nanes
ATTORNEY

Oct. 27, 1959 — L. R. HARPER — 2,910,236
CALCULATOR PROGRAM SYSTEM
Filed Jan. 15, 1954 — 12 Sheets-Sheet 8
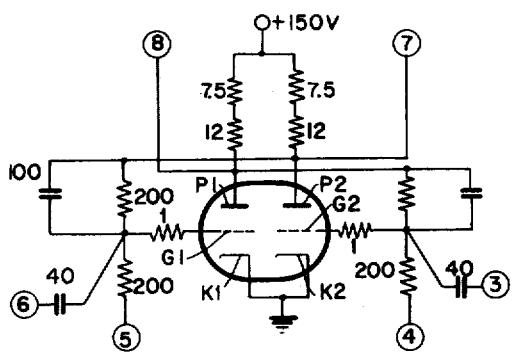
FIG. 9 — TR-1
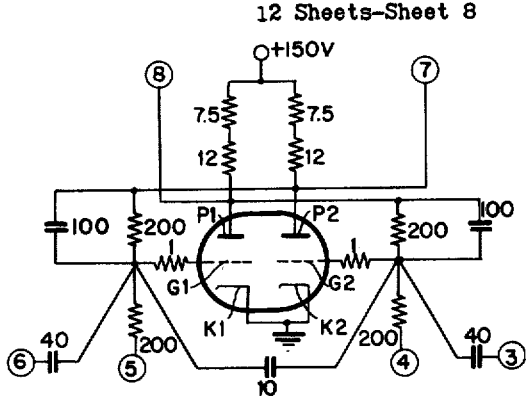
FIG. 10 — TR-2
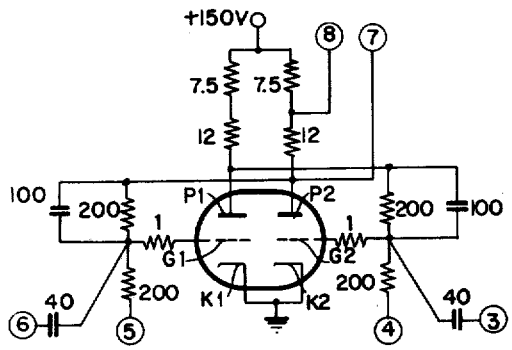
FIG. 11 — TR-4
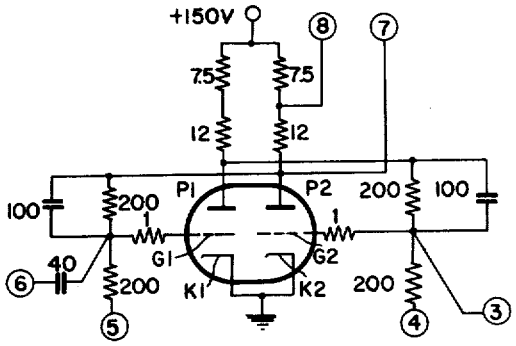
FIG. 12 — TR-40
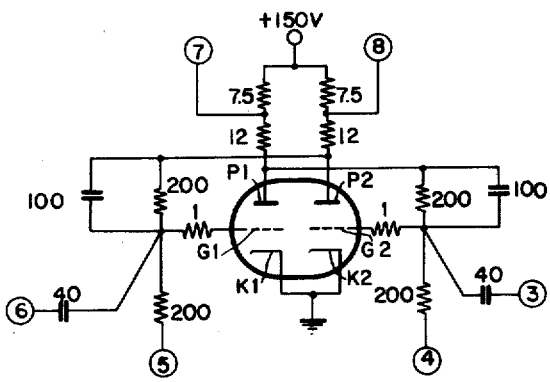
FIG. 13 — TR-13
INVENTOR
LEONARD R HARPER
BY
Murray Nanes
ATTORNEY

INVENTOR
LEONARD R HARPER

Oct. 27, 1959  L. R. HARPER  2,910,236
CALCULATOR PROGRAM SYSTEM
Filed Jan. 15, 1954  12 Sheets-Sheet 10

INVENTOR
LEONARD R HARPER
BY
Murray Names
ATTORNEY

Oct. 27, 1959 L. R. HARPER 2,910,236
CALCULATOR PROGRAM SYSTEM
Filed Jan. 15, 1954 12 Sheets-Sheet 11
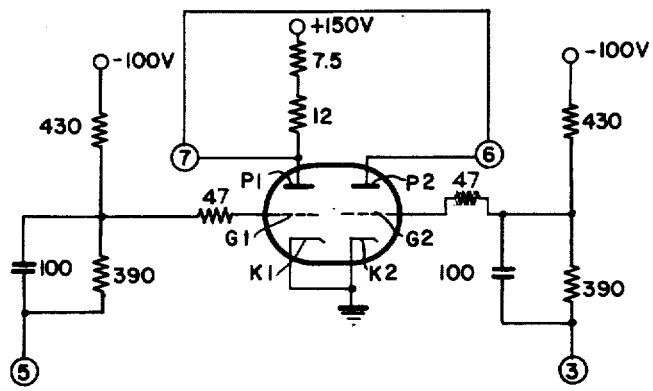
FIG. 24
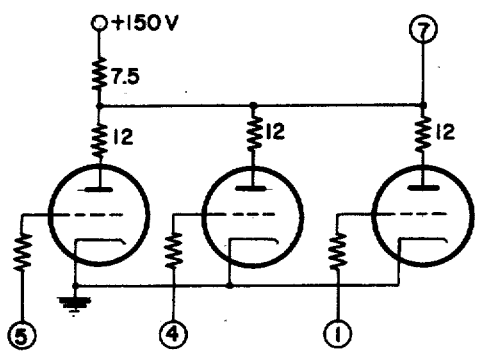
FIG. 26
FIG. 25
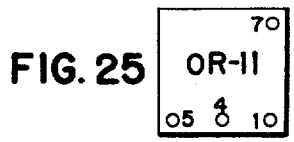
FIG. 27
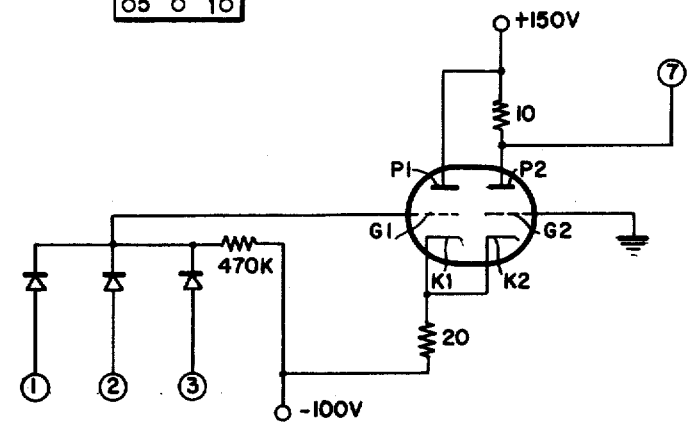
INVENTOR
LEONARD R HARPER
BY
Murray Names
ATTORNEY Oct. 27, 1959   L. R. HARPER   2,910,236
CALCULATOR PROGRAM SYSTEM
Filed Jan. 15, 1954   12 Sheets—Sheet 12

INVENTOR
LEONARD R HARPER
BY
ATTORNEY

United States Patent Office 2,910,236
Patented Oct. 27, 1959

2,910,236

CALCULATOR PROGRAM SYSTEM

Leonard R. Harper, Poughkeepsie, N.Y., assignor to International Business Machines Corporation, New York, N.Y., a corporation of New York Application January 15, 1954, Serial No. 404,278

14 Claims. (Cl. 235—157)

This invention relates to calculator programming and has particular reference to a calculator in which each arithmetic step is performed by bringing into action a series of sub-program operations, different arithmetic steps comprising different series of sub-program operations.

These sub-program operations are controlled by an electronic ring timer which sets them all up in a fixed order; only those sub-program operations being utilized which are required by the particular arithmetic step being performed at the time.

More specifically, then, this invention relates to skipping of stages in an electronic ring timer which controls the order of these sub-program operations to therefore effect skipping of those sub-program operations which are not required in the particular arithmetic step being performed by the calculator.

In the patent to R. L. Palmer et al., 2,658,681, issued November 10, 1953, there is disclosed a combination of machines, for carrying out complex calculations, consisting of an electronic calculator and a summary punch. The calculator includes as certain elements thereof, a number of electronic storage units, an electronic accumulator and a program unit. The summary punch in addition to its punching functions is employed to read cards and feed the factors taken therefrom into these electronic storage units. The entry and exit positions of all these storage units and of the accumulator are internally commonly connected to an entry channel and an exit channel, respectively, the factors being transferred via these channels from the storage units to the accumulator or vice versa under control of the program unit, which controls the transfers, in a desired sequence. All calculations take place in the accumulator, and results are then read out from the calculator to the summary punch where they are punched in the same record cards from which the original factors were read.

The program unit of the calculator supplies a series of sequential voltages to output hubs which thus indicate which program step is On and activates any program functions (arithmetic steps, etc.) which may be plug-wired to the output hubs. The program ring is stepped along by pulses from a primary timer which comprises a closed electronic ring that advances step by step, to the last stage and then repeats its cycle. The primary timer ring in addition to driving the program open ring, controls circuits which develop gating pulses and other pulses for determining the sequence of operation, within a particular program step.

In the calculator disclosed in said Palmer et al. patent, the primary timer ring is inflexible in that it must advance step by step and actually develop all the gating pulses and other control pulses whether or not they are to be used. This results in slow operation. The novel means of the present invention provides an extremely rapid combination of primary timer and program unit in which a novel means for skipping is provided, which means is controlled in a novel manner to determine which primary timer controlled operation shall be skipped (if any) in the particular program function wired.

The principal object of this invention, therefore, is to provide a more rapidly operable calculator program unit for a computer such as is disclosed in said above mentioned patent and to provide a more rapid program unit for any program control system.

Another object is to provide a program unit for a calculator which performs arithmetic steps composed of sub-programs, and to provide means for selecting only the required sub-programs necessary to perform the wired arithmetic step in the most rapid manner.

A further object is to provide a circuit capable of skipping stages in an electronic ring.

Still another object is to provide means for controlling the skipping of stages in an electronic ring by use of diode gates.

Another object is to provide means for controlling diode gates to effect selective skipping in an electronic ring.

A further object is to provide in a calculator, means for skipping stages in an electronic ring timer which controls the order of sub-program operations to, therefore, effect skipping in those sub-program operations which are not required in the particular arithmetic step being performed.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1A, 1B, 1C and 1D, arranged in a horizontal sequence from left to right in that order, comprise a complete wiring diagram showing a portion of a calculator embodying the preferred form of the invention.

Fig. 3 is a schematic diagram illustrating connections between some of the units of an electronic calculator.

Fig. 4 is a chart listing some arithmetic steps which can be performed by the calculator, and the sub-program operations necessary for carrying out each arithmetic step.

Figs. 9, 10, 11, 12 and 13 are detailed circuit diagrams and the respective block representations of electronic triggers employed in the invention.

Fig. 24 is a detailed circuit diagram and the corresponding block representation of an "And" circuit employed in the invention.

Figs. 25, 26 and 27 are detailed circuit diagrams and the respective block representations of "Or" circuits employed in the invention.

Figure 1A:
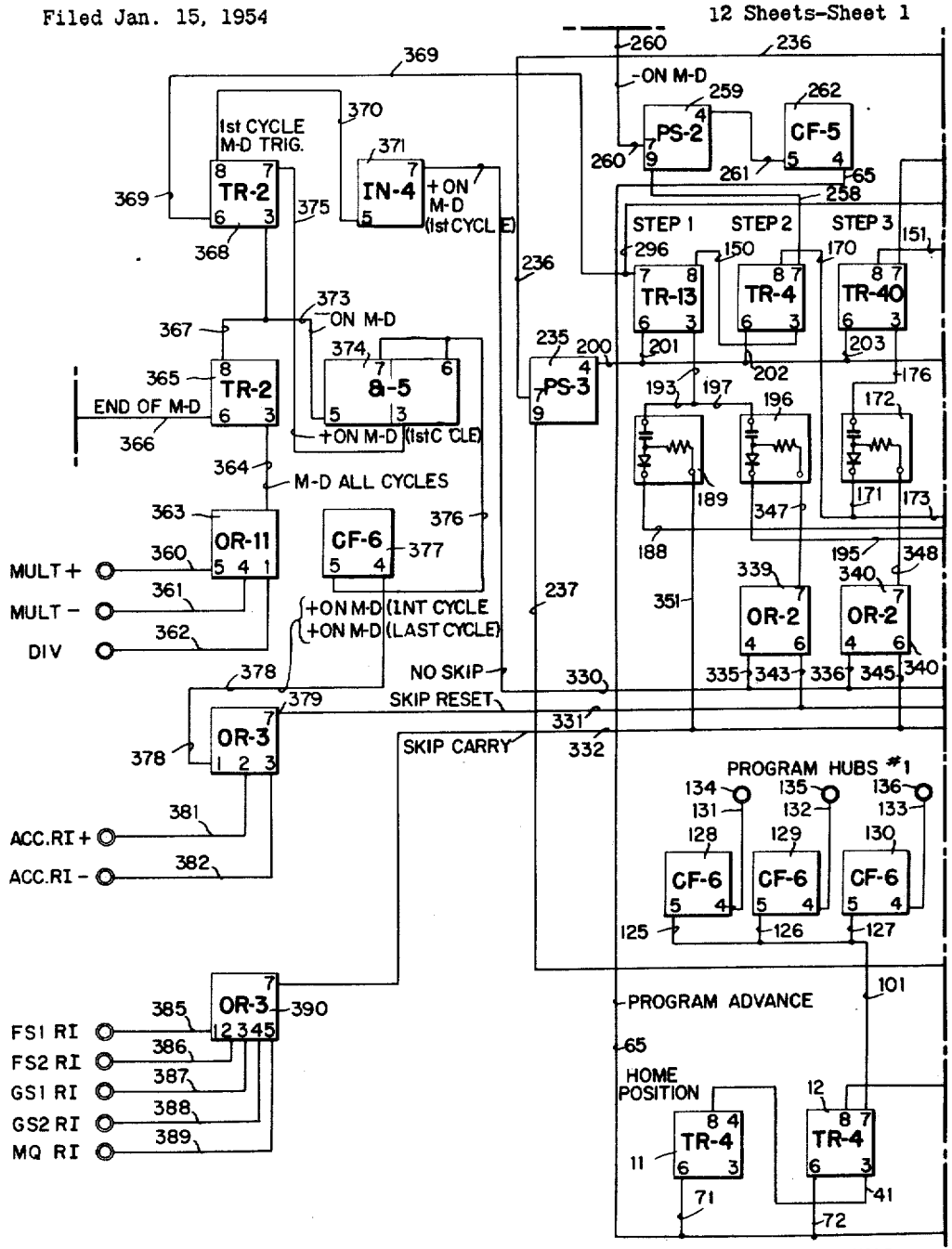

Wherever shown, unless otherwise indicated in the drawings, the values for the various resistors and condensers are in thousands of ohms and micro-microfarads, respectively. For example, a resistor labeled 200 indicates a 200K (200,000) ohm resistor; a condenser labeled 100 indicates a 100 micro-microfarad condenser.

The terms "positive" and "negative" potentials used in the discussion of the circuits refer to relative values, rather than values with respect to ground.

Referring generally to Figs. 1A to 1D inclusive of the drawings, it will be seen that the different elements comprising the invention are represented by blocks, the contents of which are illustrated in other figures of the drawings, the inputs and outputs only being indicated in Figs. 1A to 1D. Before proceeding with a description of the program circuit and its novel timer circuit, a detailed description of the respective elements such as the multivibrator, cathode followers, power tubes, triggers, inverters, pentagrid switches, "And" circuits, "Or" circuits and diode gates will be given. The contents of the respective blocks and the respective block representations are shown in Figs. 5 to 32.

Multivibrator

Figure 5:
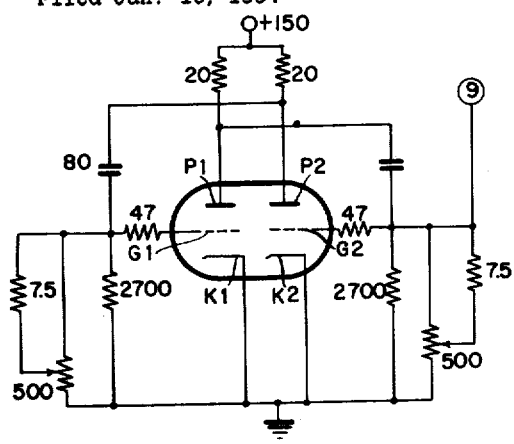
Fig. 5 is a detailed circuit diagram of a multivibrator employed in the invention and its corresponding simplified block representation.

In Fig. 5, there is shown a type of multivibrator, the block symbol for which is labeled MV–1. This multivibrator comprises, for example, a type 6J6 dual triode tube, the two triodes being contained in one envelope. Two such triodes with normally conducting grids, when retroactively capacity coupled will oscillate, in a manner now well-known in the art. This device is called a multivibrator and in the present invention is used as the parent source of square pulses supplied to the calculator.

Referring to Fig. 5, plate P1 of the left hand triode is coupled via an 80 micro-microfarad condenser in series with a 47K ohm resistor to a grid G2 of the right hand triode. Connected between ground and the junction of this condenser and resistor are a 500K ohm potentiometer, in parallel with a 2700K ohm resistor. A 7.5K ohm resistor is connected between the same junction and a tap on the 500K ohm potentiometer. Plate P1 of the left hand triode is connected via a 20K ohm resistor to a +150 volt source while plate P2 of the right hand triode is connected to the same +150 volt source through another 20K ohm resistor. Cathodes K1 and K2 are commonly connected to ground. Plate P2 is coupled to grid G1 by an 80 micro-microfarad condenser in series with a 47K ohm resistor. Connected between ground and the junction of this condenser and resistor are a 500K ohm potentiometer, in parallel with a 2700K ohm resistor. A 7.5K ohm resistor is connected between this latter junction and a tap on the 500K ohm potentiometer. The frequency of the multivibrator can be set to 50 kc. by varying the taps on the two 500K ohm potentiometers and the square wave output is taken from terminal 9, which is connected as shown.

Power tube

Figure 6:
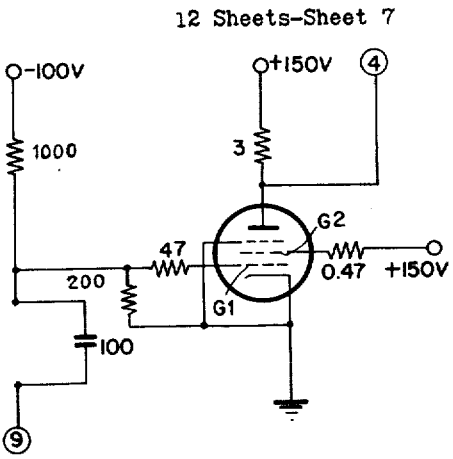
Fig. 6 is a detailed circuit diagram and corresponding block representation of a power tube employed in the invention.

Referring to Fig. 6, a power tube circuit is illustrated therein, designated as PW–7. A power tube is one which is capable of producing a power gain from an input signal with, however, a voltage inversion. The circuit shown in Fig. 6 includes a pentode, which may be of the 6AQ5 type, with a grounded cathode, and a suppressor grid directly connected to the cathode. The grid G2 is connected, through a 0.47K resistor, to a source of +150 volts. The plate is connected to a +150 volts power supply, through a 3K ohm resistor. Grid G1 is connected through a 47K ohm resistor, in series with a 100 micro-microfarad condenser, to an input terminal 9. Grid G1 receives its negative bias through the same 47K resistor connected to a divider network comprising a 200K resistor connected to ground, as shown, and a 1000K resistor connected to a source of −175 volts. An output terminal 3 is connected directly to the plate.

Cathode followers

Figure 7:
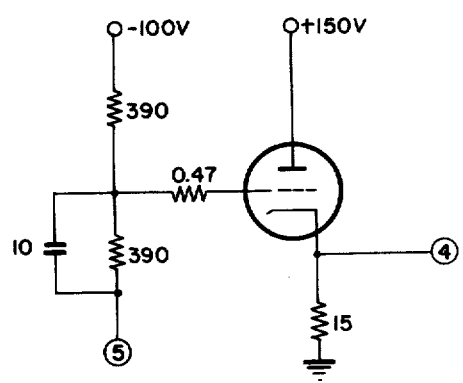
Figs. 7 and 8 are detailed circuit diagrams and respective block representations of cathode followers employed in the invention.
Figure 8:
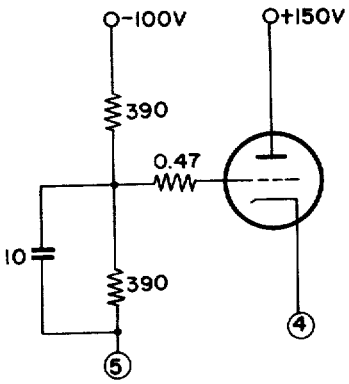
Figure 14:
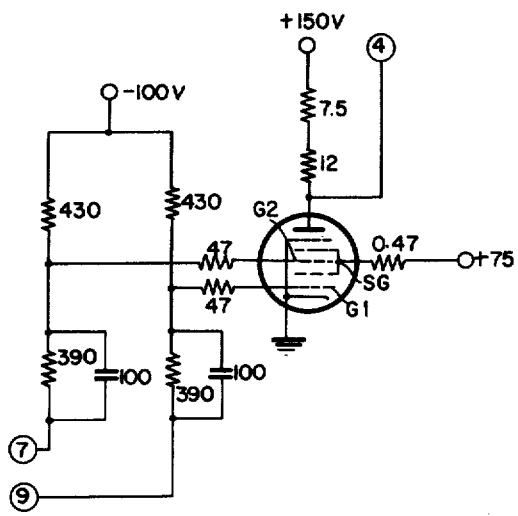
Figs. 14 to 17 are detailed circuit diagrams and the respective block representations of electronic pentagrid switching circuits employed in the invention.
Figure 15:
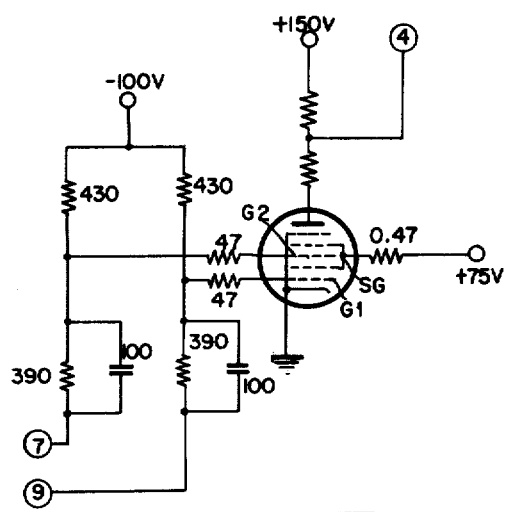
Figure 16:
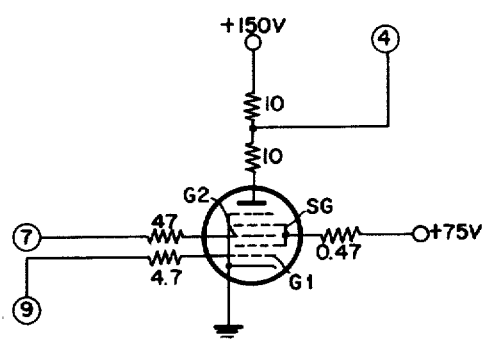
Figure 17:
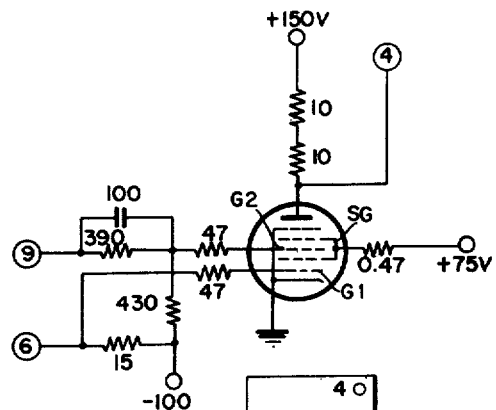
Figure 18:
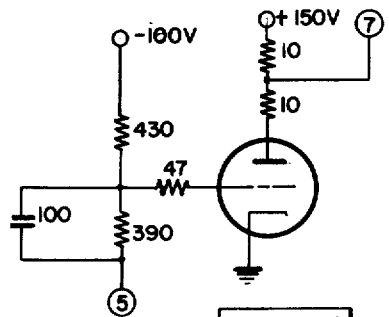
Figs. 18 to 23 are detailed circuit diagrams and the respective block representations of inverter circuits employed in the invention.

Referring to Figs. 7 and 8, there are illustrated therein, types of cathode followers whose block symbols are labeled CF–5 and CF–6, respectively. Each cathode follower used in the invention comprises a single triode which may actually be one of the triodes only, of a dual triode 12AV7 type tube. A cathode follower may be defined as a vacuum tube circuit in which the input signal is applied between the control grid and ground, but the output, instead of being taken from the plate, is taken from between the cathode and the cathode load circuit which may comprise its own resistor or a resistor in another circuit, for example. The cathode follower has a high input impedance, but a low output impedance and is capable of producing a power gain, without a voltage inversion.

The grid of cathode follower CF–5 (Fig. 7) is connected through a 0.47K ohm resistor, in series with a 390K resistor, to a negative bias supply of −100 volts and is also connected through the same 0.47K resistor, in series with another 390K resistor, shunted by a 10 micro-microfarad condenser, to an input terminal 5. The plate is directly connected to a +150 volt power supply and the cathode is connected via a 15K ohm cathode load resistor to ground. An output terminal 4 is directly connected to the cathode.

Cathode follower CF–6 (Fig. 8) differs from CF–5 only in that it does not have any 15K ohm cathode load resistors connected to ground, but its cathode is connected directly to an output terminal 4 only.

Triggers

Referring to Figs. 9 to 13, inclusive, the details of several electronic triggers are shown, designated respectively, TR–1, TR–2, TR–4, TR–40 and TR–13 which are commonly known in the art as the Eccles-Jordan type trigger. These each comprise two cross-coupled triodes (which may be included in one envelope, such as, for example, a type 6J6 tube) in which a plate P1 of a left hand triode, is coupled by means of a 200K resistor in series with a 1K resistor, to the grid G2 of a right hand triode, and plate P2 of a right hand triode is likewise coupled to the grid G1 of the left hand triode by a 200K ohm resistor in series with a 1K ohm resistor, each of these 200K ohm resistors being shunted by a 100 micro-microfarad condenser, as shown. Plates P1 and P2 of all the triggers are similarly connected to a +150 volt power supply via pairs of 12K and 7.5K ohm resistors in series, as shown. The cathodes K1 and K2 of all the triggers are grounded, as shown.

In triggers TR–1, TR–2, TR–4 and TR–13, grid G1 is connected via the 1K ohm resistor in series with another 200K ohm resistor, to a terminal 5, and is coupled through the same 1K ohm resistor in series with a 40 micro-microfarad condenser, to an input terminal 6. Grid G2 is connected by identical circuitry to a terminal 4 and to an input terminal 3. Trigger TR–40 differs from all the others only in that its grid G2 is coupled through the 1K ohm resistor directly to terminal 3.

Trigger TR–2 has a 10 micro-microfarad condenser connected between the input circuits, as shown, in order to obtain more stabilized operation; the condenser tending to prevent operation by transient pulses.

In all other respects, the triggers differ from each other only in the specific connections of the output terminals.

In triggers TR–1 and TR–2 (Figs. 9 and 10, respectively), an output terminal 8 is directly connected to plate P1 while an output terminal 7 is directly connected to plate P2, as shown.

In trigger TR-4 and TR-40 (Figs. 11 and 12), a terminal 7 is directly connected to plate P2 and a terminal 8 is connected to the tap between the 7.5K ohm resistor and the 12K ohm resistor of plate P2.

In trigger TR-13 (Fig. 13), a terminal 7 is connected to the tap between the 7.5K ohm resistor and the 12K ohm resistor of plate P1 while a terminal 8 is connected to the tap between the 7.5K and the 12K ohm resistors of plate P2.

As is now well-known in the art, the triggers described have two conditions of stability. When the left hand triode of the trigger is conducting, the voltage at plate P1, with the circuit values indicated, is lowered from approximately +140 volts to approximately +40 volts, which, through the coupling previously described, maintains the grid G2 relatively negative, so that the right hand triode is blocked when the left hand triode conducts. Thus, if the left hand triode is conducting, then plate P1 and its corresponding output are negative and plate P2 and its corresponding output are positive. This comprises one state of stability of the trigger and will hereinafter be designated as the "On" condition. In a similar manner, if the right hand triode is conducting, the reduction in voltage on the plate P2 is applied by the coupling connection, previously described, to the grid G1, to thus block the left hand triode so that plate P1 and its corresponding left hand output now become positive and this condition will hereinafter be designated as the "Off" condition.

If, for example, the right hand triode is conducting, (trigger Off) a negative voltage applied to its grid G2 via input terminal 3, for example, will flip the trigger On, by blocking the right hand triode and thus rendering the left hand side conductive. Likewise, if the left hand triode is conducting, (trigger On) a negative voltage applied to its grid G1, via input terminal 6, for example, blocks the left hand side of the tube thus flipping the trigger Off. The above two methods are normally used for flipping the triggers On and Off.

In the operation of the invention, it is required that some of the triggers be reset On and others reset Off, before the start of an operation. To reset a trigger On, a sufficiently positive voltage is applied to grid G1 to cause the left hand side of the 6J6 tube to conduct. The triggers used are so designed that a positive shift applied to either input terminal 6 or to a terminal 3 and through the 40 micro-microfarad condenser to the grids will not flip the triggers. However, by applying a positive voltage conductively through terminal 5 or 4 and through the corresponding resistor to one of the grids, the trigger will be flipped. In triggers which are to be reset On, terminal 4 is connected to a —100 volt negative bias supply, and terminal 5 is connected to a "—100 volt reset" line 10 (Fig. 1D), which is then shifted from —100 volts to ground potential, (relatively plus) when it is desired to reset the trigger, ground potential being sufficiently positive to thus reset the trigger On by rendering the left hand triode conductive.

In triggers, which are to be reset Off, it is the terminal 4 which is connected to the "—100 volt reset" line while terminal 5 is connected to the —100 volt negative bias supply, so that when the "—100 volt reset" line is shifted to ground potential, the right hand triode is rendered conductive thus resetting the trigger Off.

*Pentagrid switches*

Figs. 14 through 17, respectively, illustrate electronic switching circuits and their blocks PS-2, PS-3, PS-13 and PS-8, respectively. Each electronic switching circuit may employ a pentagrid tube of the 6BE6 type.

Each of these switches requires simultaneously applied positive voltages at the respective input terminals connected to their grids G1 and G2, in order to cause conduction of the respective tube, so that a negative output is produced when and only when both inputs are positive.

Each pentagrid tube has its cathode grounded, as shown, and its suppressor grid directly connected to the cathode. The screen grid SG of each pentagrid switch is connected via a 0.47K resistor to a source of +75 volts.

The grid G1 of pentagrid switch PS-2 (Fig. 17) is shown as connected by means of a 47K ohm resistor, in series with a 430K resistor, to a voltage source of —100 volts and is also connected through the same 47K ohm resistor, in series with a 390K ohm resistor, shunted by a 100 micro-microfarad condenser, to an input terminal 9. Grid G2 is connected through a 47K ohm resistor, in series with said 430K ohm resistor, to said source of —100 volts and is also connected through the same 47K resistor, in series with said 390K resistor, shunted by a 100 micro-microfarad condenser to an input terminal 7. The plate of switch PS-1 is connected through 12K and 7.5K ohm resistors, in series to a +150 volt supply. An output terminal 4 is connected directly to the plate.

Switch PS-3 (Fig. 15) is exactly like switch PS-2, except that it has two 10K ohm resistors, in series, connecting its plate to the +150 volt supply and its output terminal 4 connected to the junction of the two 10K ohm resistors.

Switch PS-13 (Fig. 16) has its plate connected through two 10K ohm resistors to a +150 volt supply and an output terminal 4 connected between the two 10K ohm resistors. Grid G1 of switch PS-13 is connected through a 47K ohm resistor to an input terminal 9. Grid G2 is connected through a 47K ohm resistor, to an input terminal 7.

Switch PS-8 (Fig. 17) has its plate connected through two 10K ohm resistors, in series, to +150 volt supply and its output terminal 4 connected directly to its plate.

Grid G1 is connected, through a 47K ohm resistor to an input terminal 6. Grid G2 is connected through a 47K ohm resistor in series with a 430K ohm resistor, to a —100 volt bias supply. Grid G2 is also connected through the same 47K ohm resistor and a 390K ohm resistor, shunted by a 100 micro-microfarad condenser to an input terminal 9.

*Inverters*

Inverter circuits, designated IN-4, IN-5, IN-11, IN-13, IN-31 and IN-36, respectively, are illustrated respectively in Figs. 18 through 36. The function of an inverter is to take a positive voltage supplied to its input terminal and produce a negative voltage at its output terminal. Conversely, negative inputs produce positive outputs.

Each inverter employed may comprise, for example, one half of a dual triode type 6J6 tube, except that the inverter IN-36 (Fig. 36) employs both halves of the dual triode illustrated. The cathodes of all the inverters are connected to ground as shown.

In inverters IN-4 and IN-5 (Figs. 18 and 19 respectively), the grids is coupled via a 47K resistor and a 430K ohm resistor to a source of —100 volts and is also connected to an input terminal 5 through the same 47K resistor, in series with a 390K ohm resistor, shunted by a 100 micro-microfarad condenser as shown. The plate is connected to a +150 volt power supply through two 10K ohm resistors, in series. IN-4 differs from IN-5 in that the output terminal 7 of IN-4 is connected to the junction of the two 10K ohm resistors, while inverter IN-5 has its output terminal 7 connected directly to the plate.

In inverters IN-11 and IN-13 (Figs. 20 and 21 respectively), the grid is connected via a 47K ohm resistor to an input terminal 5 and the plate is connected to a +150 volt power supply through 12K and 7.5K ohm resistors in series. IN-11 differs from IN-13 in that the output terminal 7 of IN-11 is connected to the junction of the 7.5K and the 12K ohm resistors, while inverter IN-13 has its output terminal 7 connected directly to the plate.

Inverter IN-31 (Fig. 22) has an input terminal 3 which is coupled to the grid of the triode through a 25 micro-microfarad condenser and a 1K ohm resistor. A —100 volt source is applied to one end of a 510K ohm resistor connected at its other end to a 39K ohm resistor which in turn is connected to ground. The junction of the 510K ohm resistor and the 39K ohm resistor is connected via the above mentioned 1K ohm resistor, to the grid of the triode, the plate of which is connected directly to an output terminal 9.

In inverter IN-36 (Fig. 23) a —100 volt source is applied to one end of a 430K ohm resistor, the other end of which is connected via a 390K ohm resistor shunted by a 100 micro-microfarad condenser to a terminal 3. The junction of the 430K ohm resistor and the 390K ohm resistor is connected, via one 47K ohm resistor, to the grid G1, and via another 47K ohm resistor, to the grid G2. Plate P1 of the left hand triode is connected directly to an output terminal 7 and is also connected via a 12K ohm and a 7.5K ohm resistor, in series, to a +150 volt supply, while plate P2 of the right hand triode is connected directly to an output terminal 6 and is also connected, via a 12K ohm and 7.5K ohm resistor, in series, to the +150 volt supply.

*"And"* circuit

When the plates of two inverters, which are negatively biased beyond cutoff, have a common plate resistor, the combined circuit, by using two sepaarte inputs, can be an "And" circuit as shown in Fig. 24. The value of the plate resistors are chosen so that the inverter tubes are operated on the portion of their characteristic curve where most of the voltage drop is across the load resistor and where changes in voltage at the plate are very slight, with a change in grid voltage. This means that the voltage at the commonly connected plates of Fig. 24 is essentially the same, and negative, whether one inverter tube is conducting or both are conducting. Only when neither inverter is conducting do the commonly connected plates go positive.

A so-called negative "And" circuit makes use of this effect by keeping the two inverters normally conducting and applying constant positive voltages to the two inputs. Then in order to get a positive output, both inputs must go negative.

Basically, an "And" circuit acts like a pentagrid switch, in that it requires a coincidence of two inputs to obtain one output. The negative "And" circuit, differs from the pentagrid switch, in that it acts to produce a positive output signal, only upon a coincidence of two negative inputs, while the pentagrid switch acts, as previously described, to effect a negative output signal, only upon a coincidence of two positive inputs.

Figure 19:
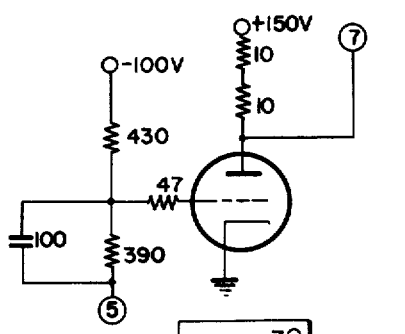

The "And" circuit disclosed in Fig. 24 has its block insignia labeled &-5 and comprises the two triodes of a dual triode 6J6 type tube. The left hand triode comprises a type IN-5 inverter (Fig. 19). The right hand triode is similar to a type IN-5 inverter except that its input terminal is labeled 3 and its output terminal 6 and it has no plate resistors. Output terminal 7 (Fig. 24) is conductively connected to output terminal 6 as shown and the circuit then has a common plate resistor and functions as an "And" circuit.

*"Or"* circuits

An "Or" circuit is used where there are two or more inputs which must be isolated from each other but which must operate in such a way that any one or more than one input will produce an output.

When the plates of two or more inverters, which are negatively biased beyond cutoff, have a common plate resistor, the combined circuit, by using two or more separate inputs can be an "Or" circuit. Just as in the &-5 "And" circuit (Fig. 24), the voltage at the commonly connected plates is essentially the same, and negative, whether one or more inverter tubes are conducting. Only when neither inverter is conducting do the commonly connected plates go positive. An "Or" circuit makes use of this effect by keeping the inverters normally cutoff, and by supplying constant negative voltages to all the inputs. Then, in order to get a negative output, any one or more than one output must go positive.

Figure 20:
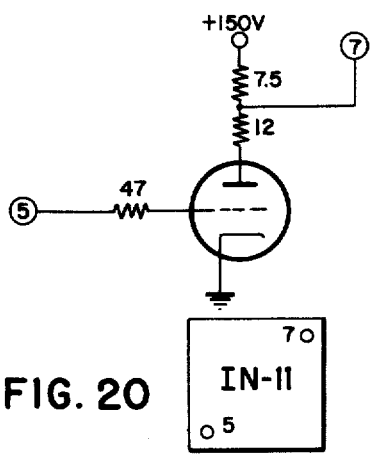
Figure 21:
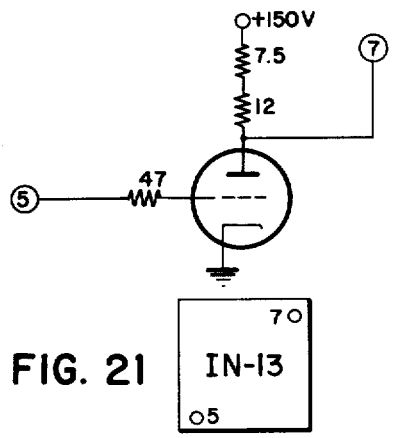
Figure 22:
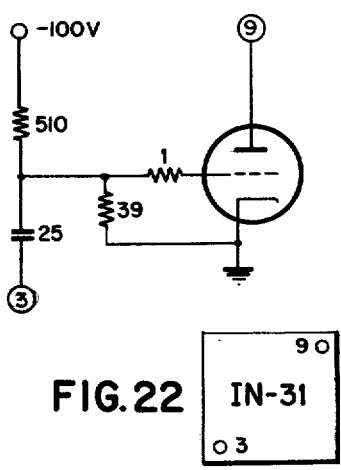
Figure 23:
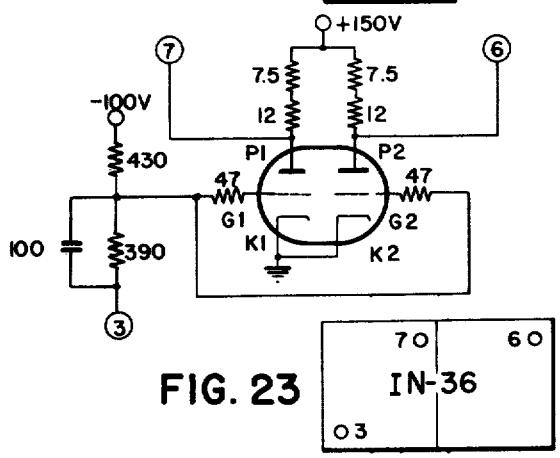

The "Or" circuit disclosed in Fig. 25 has its block insignia labeled "Or-11" and comprises three triodes. The left hand triode comprises a type IN-11 inverter (Fig. 20). The other two triodes are the same except that they do not have their own 7.5K ohm plate resistors. The input terminals of the other two triodes are labeled 4 and 1 while all three output terminals are conductively connected as shown so that the circuit then has a common 7.5K ohm resistor and functions as an "Or" circuit.

When the cathodes of two diodes, the anodes of which are normally held at ground potential, have a common cathode resistor, the combined circuit can be an "Or" circuit. With both anodes at ground potential, there is no conduction in the diodes and the cathodes are at ground potential. The value of the cathode resistor is so chosen that it is high in comparison with the resistance of the conducting diode. Therefore, if either or both anodes go positive causing conduction, the voltage drop across the diodes is small compared to that across the cathode resistance, and the cathodes rise substantially to the voltage at the anodes, creating a positive shift at output terminal 7.

The "Or" circuit shown in Fig. 26 is the type in which either or both inputs must go positive in order to obtain a positive output. This "Or" circuit has its block insignia labeled "OR-2" and may comprise two germanium diode (or two diodes of a dual diode 6AL5 type tube) using a common cathode resistor of 220K ohms tied to ground. An output terminal 7 is tied to the cathodes. An input terminal 4 is tied to the left hand anode and an input terminal 6 is tied to the right hand anode.

Another "Or" circuit labeled "OR-3" employed in the invention is shown in Fig. 27 and is used where it is desired that a plurality of positive inputs shall produce a positive output. "Or" circuit "OR-3" differs functionally from "OR-2" only in the voltage levels at the output terminals. The "OR-3" type "Or" circuit is shown as comprising three diodes and two triodes connected so that the diodes act as the "Or" circuit and the triodes act to give the proper voltage level. More diodes may be used to provide a greater number of inputs; the number of diodes being limited only by their back resistance. The three diodes shown have a common 470K ohm cathode resistor which is tied to —100 volts. Input terminals 1, 2 and 3 are shown connected to the anodes. The common cathodes are connected to the grid G1 of the two triodes which have their cathodes commonly connected via a 20K ohm resistor to —100 volts. Plate P1 is directly connected to +150 volts. Grid G2 is directly connected to ground. Plate P2 is connected via a 10K ohm resistor to +150 volts and an output terminal 7 is directly connected to plate P2.

With all the input terminals kept negative, the commonly connected cathodes are negative and this negative voltage applied to grid G1 keeps the left hand triode cut off. Since grid G2 is at ground, the right hand triode is normally conducting. When any of the input terminals go positive, a positive voltage is applied from the commonly connected cathodes of the two diodes to grid G1 causing the left hand triode to conduct. The current passing through the 20K ohm cathode resistor causes a positive voltage rise at the cathodes which is enough to cut off the right hand triode. The plate P2 then will go positive. Thus, if any of the input terminals goes positive, the output terminal 7 at plate P2 goes positive.

Diode gating

Figure 28:
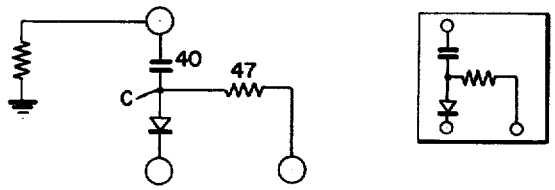
Fig. 28 is a diagrammatic illustration and corresponding block representation of a diode gating circuit employed in the invention.

Fig. 28 is a diagrammatic illustration and corresponding block representation of a diode gating circuit which is described in detail in the L. R. Harper Patent 2,580,771 and is shown in Fig. 28 as consisting of a resistance input terminal connected via a 47K ohm resistor to a terminal C which is connected to the plate side of a GE IN-52 crystal diode, the cathode side of which is connected to a diode input terminal. Terminal C is also connected via a 40 micro-microfarad condenser to a condenser ouput terminal which in turn is connected via load resistor to ground.

In Figs. 29 to 32 are shown the effects that varying the voltages at the resistance and diode input terminals of Fig. 28 have on terminal C and the condenser output terminal. For purpose of illustration and simplification, it will be assumed that the voltage at the resistance input terminal can be either +95 volts or +145 volts and this is true for the voltage at the diode input terminal too. By means of Figs. 29 to 32, it will be shown that the only way to get a negative pulse at the condenser output terminal which is sharp enough to flip a trigger, is to maintain the voltage at the resistance input terminal at +145 volts and simultaneously, shift the voltage at the diode input terminal negative from +145 volts to +95 volts.

Figure 29:
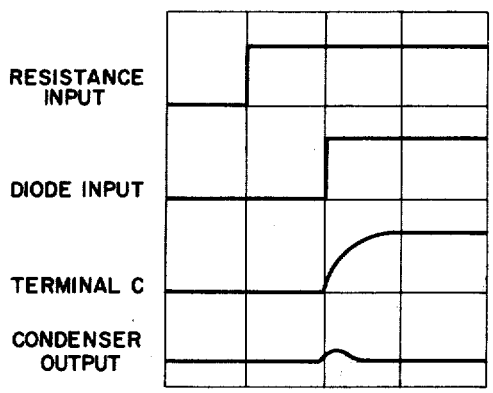
Figs. 29, 30, 31 and 32 are a series of timing charts illustrating the effects of variation in voltages at the resistance and diode inputs of the diode gate of Fig. 28 on the voltages at terminal C and the condenser output terminal.

Fig. 29 illustrates a condition where initially the voltages at both the resistance and diode input terminals are +95 volts and then the resistance input terminal shifts positive followed some time later by a positive shift at the diode input terminal. Initially when the resistance and diode input terminals are both at +95 volts, there is no difference of potential across the diode which, therefore, does not conduct. Since the diode is not conducting, there is no voltage drop across the 47K ohm resistor and the anode of the diode and terminal C are at the same potential as the resistance input terminal which is +95 volts. Since there is no current flowing through the load resistor, and, therefore, no voltage drop across it, the top of the load resistor and the condenser output terminal are at ground potential.

Then, when the resistance input terminal rises (Fig. 29), there is conduction through the diode and 47K ohm resistor. Since the resistance of the diode when conducting is small compared to the 47K ohm resistor, there is a negligible drop across the diode and so the voltage at the anode of the diode and at terminal C remains at approximately +95 volts which is the voltage at the diode input terminal. Since there is no change of voltage at terminal C, the voltage at the condenser output terminal remains the same.

Later, when the voltage at the diode input terminal rises sharply to +145 volts (Fig. 29) the voltage at terminal C will rise to +145 volts, but it cannot rise sharply, as the condenser must exponentially charge through the load resistor and the 47K ohm resistor. As terminal C rises exponentially, the voltage at the condenser output terminal tends to follow it up, but as the condenser gets charged up, the decrease in current causes a decreased voltage drop across the load resistor and causes the voltage at the condenser output terminal to return to its original level. This positive rise is so slight that if the condenser output terminal were connected to the grid of a trigger, the trigger would not be affected.

Figure 30:
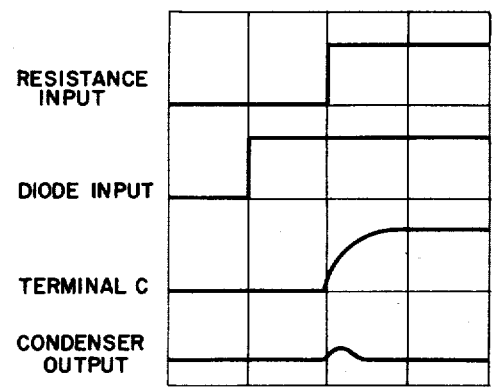

Fig. 30 differs from Fig. 29 only in that the voltage at the diode input terminal rises first and later the voltage at the resistance input terminal rises. When the voltage at the diode input terminal rises, the diode remains cut off and there is no voltage drop across the 47K ohm resistor, and so the voltage at terminal C remains at the voltage of the resistance output terminal which is +95 volts.

Later, when the voltage at the resistance input terminal rises sharply (Fig. 30), the voltage at terminal C tends to rise to the same level by an exponential charging of the condenser through the load resistor and the 47K ohm resistor. The voltage at the condenser output terminal then rises slightly and falls just as in Fig. 29 and again this rise is not enough to affect a trigger.

Figure 31:
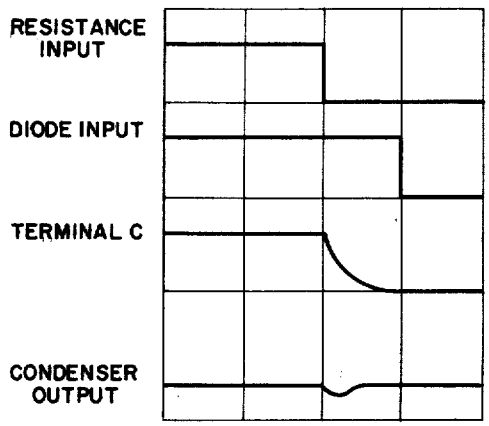

Fig. 31 illustrates a condition where the voltages at the resistance and diode input terminals are both +145 volts and then the resistance input terminal shifts negative, followed some time later by a negative shift at the diode input terminal. In the initial stage, the diode is not conducting and so terminal C is at the +145 volts of the resistance input terminal. When the voltage at the resistance input terminal falls sharply, the diode is still cut off but there is an exponential discharging of the condenser through the load and 47K ohm resistors and the voltage at terminal C falls exponentially. As terminal C falls, the voltage at the condenser output terminal tends to follow it down but as the condenser gets charged up, the decrease in current causes a decreasing voltage drop across the load resistor and causes the voltage at the condenser output terminal to return to its original level and again this rise is not enough to affect a trigger.

Figure 32:
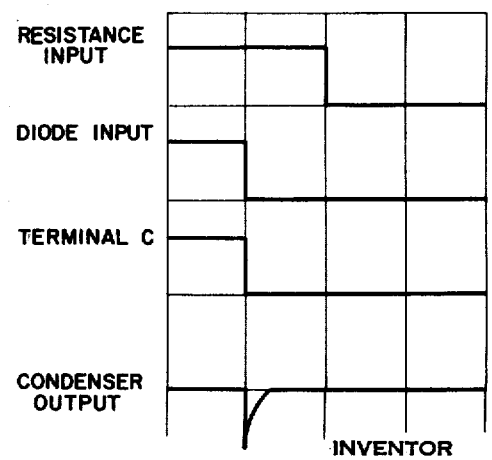

Fig. 32 differs from Fig. 31 only in that the voltage at the diode input terminal falls before the voltage at the resistance input terminal. When the voltage at the diode input terminal falls sharply, there is an immediate conduction of the diode which causes terminal C to fall sharply to approximately the potential of the diode input terminal. The sharp fall at terminal C causes the condenser to discharge through the load resistor and the diode. At the first instant, the condenser acts as a short circuit and so instantaneously there is a large negative voltage across the load resistor and there is, therefore, a sharp drop in voltage at the condenser output terminal.

This sharp negative shift at the condenser output terminal can be used to flip a trigger.

It can thus be seen that only when the conditions of Fig. 32 are met will there be a pulse at the condenser output terminal sharp enough to flip a trigger, i.e., if the resistance input terminal is conditioned positive at least until a negative pulse is applied to the diode input terminal, a sharp negative pulse will appear at the condenser output terminal. Use is made of this principle of diode gating in the novel circuit which will be presently described.

While specific types of elements and values of resistors and condensers for each element have been defined in describing the multivibrator, power tube, cathode followers, triggers, switches, inverters, "And" circuits, "Or" circuits, and diode gates, these are to be taken as exemplary only and the elements and values may be varied, in accordance with the knowledge of those skilled in the art, without departing from the spirit of the invention.

Electronic Calculator

Before proceeding to the operation of a novel electronic ring timer skip circuit, per se, it is believed that a brief description of an electronic calculator, which utilizes this invention as a part thereof, will highlight its operation. Basically, the calculator used is the one fully described in said patent to R. L. Palmer et al., with certain obvious changes necessary for direct incorporation of this invention into the calculator, as will be described specifically later.

The calculating unit, as shown in Fig. 3, consists of a number of electronic storage units, a multiplier-quotient unit, a shift unit, add-subtract control, and one accumulating counter. The entry and exit positions of all the storage units, the multiplier-quotient unit and the accumulator are commonly connected in the entry and the exit channel (Fig. 3).

The electronic storage units comprise electronic counters, each consisting of a group of four cascade connected triggers interconnected to produce operations of the four triggers out of their normal cascade operation, whereby the normal binary cascade operation of four triggers only is altered to decade operation, as described in the patent to B. E. Phelps, 2,584,811, issued February 5, 1952. The storage units are divided into Factor Storage Units (FS–1, FS–2, etc.) and General Storage Units (GS–1, GS–2, etc.), five positions 1 to 5 of a Factor Storage Unit FS–1 being illustrated in Fig. 1D. Both Factor and General Storage Units are equipped to read out to other units, and to read in from a card or from other units. The General Storage units can also read out to a card through a Punch Exit.

Each storage unit is provided with its own Read-In and Read-Out controls. Entry into a storage unit is under the control of a Read-In control which, when impulsed, automatically clears the previous reading by resetting the storage unit before entry is made. Thus, a storage unit holds an entry until the next entry is made. Impulsing the Read-Out control causes the amount standing in the storage unit to Read-Out without disturbing the setup, so that it is available for use as often as desired.

The main purpose of the electronic calculator of said Palmer et al. patent is to perform a series of repetitive calculations, starting with factors punched, in successive record cards with the various steps under control of manually plugged wiring. This calculator is employed for all types of calculations including addition, subtraction, multiplication and division and series of calculations comprising combinations of these specific types of calculations. To perform these various calculations, transfer of factors between the storage devices and the accumulator must be performed.

All calculations take place in the single accumulator which is assisted by the multiplier-quotient storage unit during multiplication and division. The multiplier-quotient unit consists of a counter similar to that of the other storage units while the electronic accumulator comprises the same type of counters along with carry means.

The multiplier-quotient unit (abbreviated MQ unit) contains the multiplier during multiplication, and the quotient during division. In multiplying a multiplicand in a storage unit by a multiplier in the MQ unit, a product is automatically developed in the accumulator by a method of over and over addition described in said Palmer et al. patent. In dividing, a dividend in the accumulator divided by a divisor in a storage unit automatically develops a quotient in the MQ unit by a method of over and over subtraction.

Factors are read into the accumulator successively over the internal channels. As amounts pass to and from the accumulator, they travel successively through (Fig. 3) Read-Out gates, Read-Out control hubs, an Exit Channel, a Shift Unit, Add-Subtract control, an Entry Channel, Read-In control hubs, and Read-In gates.

The Shift Unit displaces the entry of amounts into the accumulator and drops unwanted decimals on Read-Out from the accumulator. The Add-Subtract control determines the form of entry to the accumulator only, because addition and subtraction are possible only in the accumulator.

A program ring of twenty steps is disclosed herein to supply to exit hubs a series of output voltages, one step at a time, to be used in selecting the order of the program functions to be performed by the calculator. Each program step will be shown to have three exit hubs for the simultaneous control of three functions, usually the Read-Out of the transmitting unit, the Read-In of the receiving unit, and the Shift Unit or Multiply and Divide controls. The program unit is not shown in Fig. 3, but it can be understood that the exit hubs, which are connected by external plugging to selected function control hubs, are activated by the program ring, while the program ring has its basic timing controlled by the primary timer, so that the program ring steps from one program step to the next step at the beginning of each such primary timer cycle. It is this primary timer which supplies voltages for controlling the sub-program operations Reset, Transfer, Carry, etc., of which the arithmetic steps are comprised.

The program unit is not shown in Fig. 3 which is only a schematic of the calculator, but it is described below in greater detail in conjunction with Figs. 1A, 1B, 1C and 1D where the means for controlling the other units are indicated.

The Read-In and Read-Out control hubs are plugwired for controlling the specific units to be used. It is to be noted that the transfer of a single amount, which is accomplished in one program step, may require three control wires. One wire designates the unit which is to read out, the second may designate the unit which is to read in and the third may designate the displacement to be provided by the shift unit. In Fig. 3, for example, the amount in the factor storage unit (FS–2) is transferred to the accumulator by means of two wires indicated by dotted lines. No shift is shown for this example. An amount coming from the factor storage unit (FS–2) can be traced through the Read-Out gate, the factor storage Read-Out control hubs (FS2–RO), the Exit Channel, Shift Unit, Add-Subtract control, Entry Channel, accumulator Read-In control hubs (ACC–RI), and the Read-In gates to the accumulator.

The formula $A-B=C$ requires three program steps, the first for A to add into the accumulator from storage, the second for B to subtract into the accumulator from storage, and the third for the result C to enter storage from the accumulator. If the accumulator is reset as it reads on program step three, the fourth program step can begin an entirely new calculation.

*Program Ring*

Basically, the program ring comprises a ring of electronic triggers of the type generally as shown in Fig. 8 of the Overbeck Patent 2,404,918, each trigger comprising one step and each trigger being formed by a pair of cross-coupled triodes. The program ring illustrated and described presently, consists of 20 program steps (although any number of steps can be used), only one step being On, at any particular time. Upon simultaneous application of a pulse, to each of the triggers of the ring, as described in said Overbeck patent, the stage that is On goes Off, and, in going Off, flips the next stage On. With each incoming pulse, the ring advances one step. The program ring differs slightly from that shown in said Overbeck patent, in that it is what is commonly referred to as an "open" electronic ring, that is, one that shuts itself "Off, at its end, rather than starting over again.

The program ring includes a home position trigger 11 (Fig. 1A) and twenty other triggers 12 to 31, inclusive. All the triggers are of type TR–4 (Fig. 11). Trigger 11 has circuit connections such that it is reset On, before the start of calculation, while all the others are reset Off. Leads 41 to 60, respectively (Figs. 1A, 1B and 1C) connect the tapped output terminals 8 (see also Fig. 11) of each of the triggers to the respective right hand input of the succeeding trigger while lead 61 connects output terminal 8 of the last program trigger 31, to the left hand input of a trigger 63, which is a type TR–2 (Fig. 8) and which is called the Calculate Start-Stop trigger. An input lead 65, supplying negative pulses from the primary timer (in a manner later to be described) is connected through leads 71 to 91, inclusive, to each of the respective left hand inputs of triggers 11 to 31, inclusive.

The first negative input pulse on line 65 acts via line 71 to turn Off the home position trigger 11, which as stated, has been initially reset On, but this pulse does not effect any of the other triggers, since they have all been reset Off. When trigger 11 goes Off, its plate P–2 (Fig. 11) goes negative, as previously described, and a portion of this negative swing is applied from its output terminal 8 via line 41 to the input terminal 3 of trigger 12, to thus turn this trigger 12 On. The next pulse on line 65, acts via line 72, to turn Off trigger 12, which thus turns trigger 13 On. This stepping process continues, until the last trigger 31 goes Off, which, via line 61, and the terminal 6 of the Cathode Start-Stop trigger 63, turns it Off, thereby ending the program.

Figure 1B:
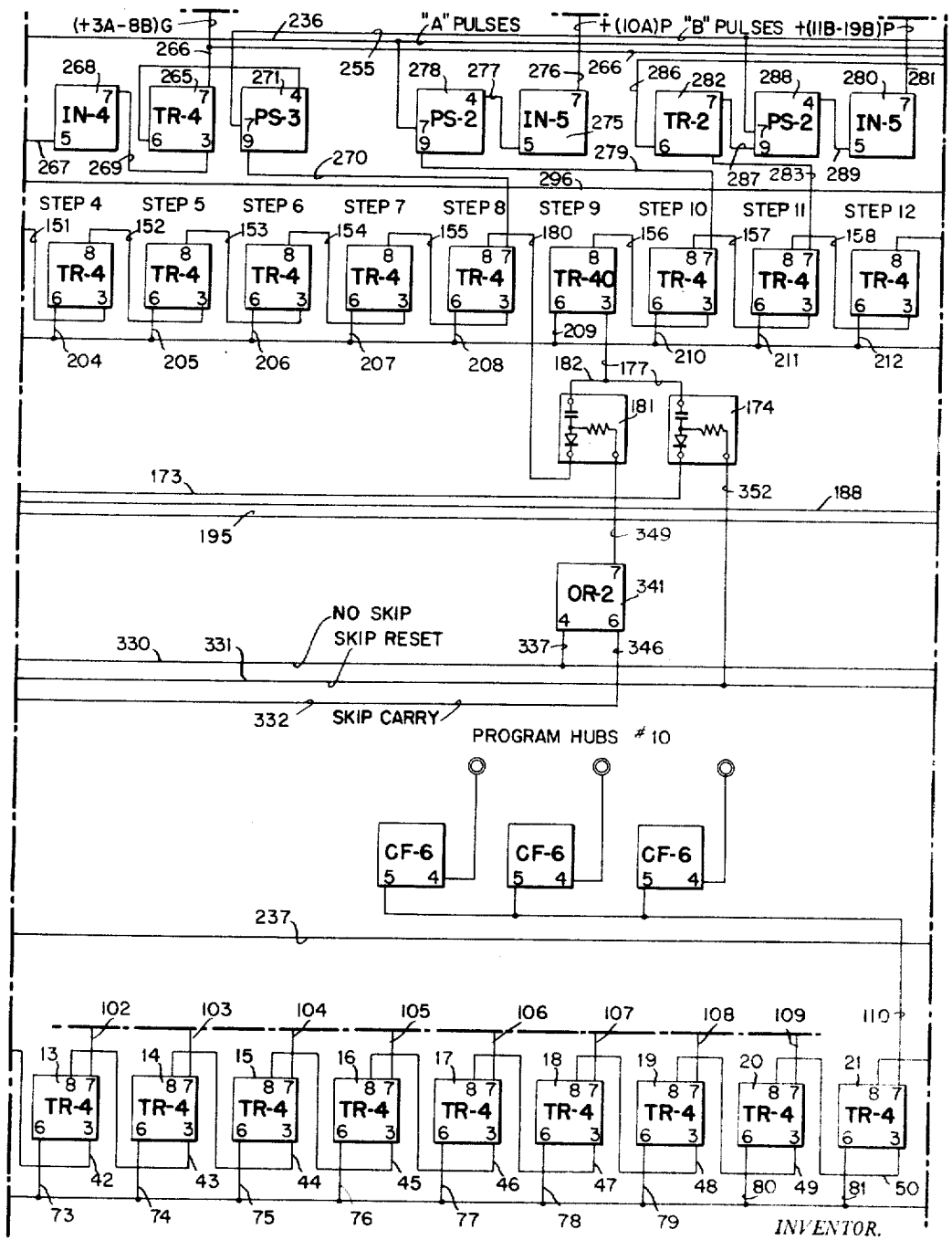
Figure 1C:
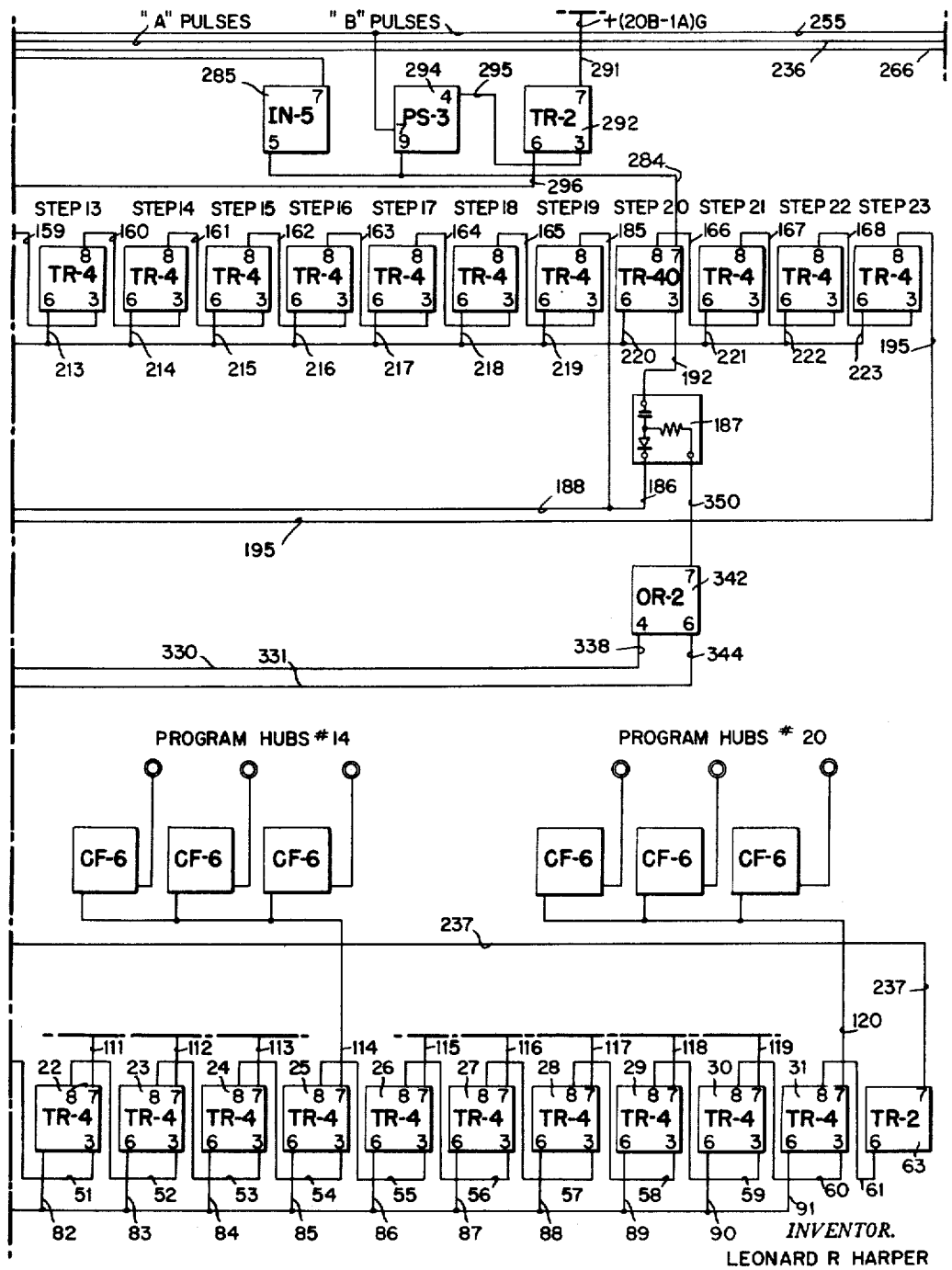

Leads 101 and 120, inclusive, respectively, connect the output terminals 7, respectively, of each of the triggers 12 to 31, inclusive, to inputs of several cathode followers. Home position trigger 11 is not connected to any cathode followers because no calculation is desired while the home position trigger 11 is On. In Figs. 1A, 1B and 1C, only the cathode followers which are connected to triggers 12, 21, 25 and 31 are shown, but it is to be understood that there are cathode followers connected to each of the triggers of the program ring. Lead 101 is connected to leads 125, 126 and 127, which are connected, respectively, to the inputs of cathode followers 128, 129 and 130, which are of the type CF–6 (Fig. 8). The outputs of these cathode followers are leads 131, 132 and 133, respectively, which are connected to the program exit hubs #1 labeled 134, 135 and 136, respectively. Three such program exit hubs are provided for each and every program step.

The types of program functions which can be activated by the program exit hubs in the calculator, as described in said Palmer et al. patent, are Storage Read-In (FSRI, GSRI and MQRI), Storage Read-Out (FSRO, GSRO and MQRO), Accumulator Read-In (ACC RI+, and ACC RI—), Accumulator Read-Out (ACC RO, and ACC RO and RESET), Multiply (MULT+, and MULT—) and Divide (DIV.). Both Multiply and Divide are separated into first, intermediate and last cycle. All these functions are shown listed in Fig. 4, in particular groupings for reasons to be made apparent presently.

Primary timer

The primary timer, which in the Palmer et al. patent previously mentioned, is a ring of 23 triggers, has outputs from the various triggers which comprise pulses (or voltage conditions) at certain times in the primary cycle. These are used for controlling gating circuits which are thereby permitted to transmit a definite number of pulses to a circuit element or to operate a device directly.

The primary timer ring (Figs. 1A, 1B and 1C) comprises triggers consecutively labeled "step 1" to "step 23" inclusive. Trigger "step 1" is of the type TR–13 (Fig. 13) and has circuit connection such that it is reset On while all the others are reset Off. Trigger "step 3," "step 9" and "step 20" are of the type TR–40 (Fig. 12). All the other primary timer triggers are of the type TR–4 (Fig. 11). Lead 150 connects the right hand output of trigger "step 1" to the right hand input of trigger "step 2." Leads 151 to 155, inclusive, respectively, connect the right hand output of each of triggers "step 3" to "step 7" to the right hand input of the succeeding trigger. Leads 156 to 165, inclusive, respectively, connect the right hand output of each of the triggers "step 9" to "step 18" to the right hand input of the succeeding trigger. Leads 166 to 169, inclusive, respectively, connect the right hand output of each of triggers "step 20" to "step 22" to the right hand input of the succeeding trigger.

The right hand output of trigger "step 2" is connected via a lead 170 to the diode input terminal of diode gate 172 and via a lead 173 to the diode input terminal of diode gate 174. The condenser output terminal of diode gate 172 is connected via lead 176 to the right hand input of trigger "step 3," while the condenser output terminal of diode gate 174 is connected via lead 177 to the right hand input of trigger "step 9." The right hand output of trigger "step 8" is connected via a lead 180 to the diode input terminal of a diode gate 181 while condenser output terminal is connected via a lead 182 to the right hand input of trigger "step 9."

The right hand output of trigger "step 19" is connected via a lead 185 and a lead 186 to the diode input terminal of diode gate 187 and via leads 185 and 188 to the diode input terminal of diode gate 189. The condenser output terminal of diode gate 187 is connected via a lead 192 to the right hand input of trigger "step 20," while the condenser output terminal of diode gate 189 is connected via lead 193 to the right hand input of trigger "step 1." The right hand output of trigger "step 23" is connected via a lead 195 to the diode input terminal of a diode gate 196, the condenser output terminal of which is connected via a lead 197 to the right hand input of trigger "step 1."

An input lead 200 (Fig. 1A) supplied with negative pulses is connected via lead 201 to 223, respectively, to each of the left hand inputs of all the twenty-three primary timer triggers. The first negative pulse will turn Off trigger "step 1" and apply a negative pulse to turn On trigger "step 2" via the lead 150 in a manner similar to the advancement described for the program ring. The next negative pulse will turn Off trigger "step 2" and apply a negative pulse via lead 170 to the diode gates 172 and 174. As will presently be described, only one of the diode gates 172 and 174 will be conditioned at any one time to give a negative output voltage at its condenser output terminal. If diode gate 172 is conditioned, trigger "step 3" will be turned On via lead 176 but if diode gate 174 is conditioned, the primary timer will skip from trigger "step 2" to turn On trigger "step 9" via lead 177. When trigger "step 3" is turned On, further negative input pulses will advance the On condition in succession because of the interconnecting leads until trigger "step 8" is turned Off, at which time a negative input pulse will be applied via lead 180 to diode gate 181. It will presently be shown that diode gate 181 is always conditioned when trigger "step 8" is turned Off, and thus a negative output via lead 182 will turn On trigger "step 9."

When trigger "step 9" is turned On, any further negative input pulse will advance the On condition in succession because of the interconnecting leads until trigger "step 19" is turned Off, and applies a negative pulse via lead 185 and 186 to the diode gate 187 and via leads 185 and 188 to the diode gate 189. Again, as will be presently described, only one of the diode gates 187 and 189 will be conditioned at any one time to give a negative output voltage at its condenser output terminal. If diode gate 187 is conditioned, trigger "step 20" will be turned On via lead 192, but if diode gate 189 is conditioned, the primary timer will skip from trigger "step 19" to turn On trigger "step 1" via lead 193. When trigger "step 20" is turned On, further negative input pulses will advance the On condition, in succession, because of the interconnecting leads until trigger "step 23" is turned Off, at which time a negative input pulse will be applied via lead 195 to diode gate 196. It will be shown below that diode gate 196 is always conditioned when trigger "step 23" is turned Off, and thus a negative output via lead 182 will turn On trigger "step 1" to restart the ring.

It can thus be understood at this point that the primary timer ring is capable of selectively skipping from trigger "step 2" to trigger "step 9" and also from trigger "step 19" to trigger "step 1."

The above mentioned input lead 200 for the primary timer ring is connected to the output terminal of a PS–3 type switch 235 (Fig. 1A), in which the grid 2 input terminal 7 is supplied with positive pulses via a lead 236 from a source to be presently described. Grid 1 input terminal 9 of this switch is connected via a lead 237 (Figs. 1A, 1B and 1C) to the right hand output terminal 7 of the Calculate Start-Stop trigger 63.

When it is desired to start calculating, this Calculate Start-Stop trigger 63 is reset On by applying a cam produced pulse to input terminal 5 (see Fig. 10) as described in detail in said Palmer et al. patent. The positive voltage which is thus produced at terminal 7 is applied via lead 237 (Figs. 1A, 1B and 1C) to condition grid 1 of switch 235 (Fig. 1A) to allow the positive pulses, from lead 236, to pass through switch 235 and start advancing the primary timer ring. As stated above, at the end of the program, the Calculate Start-Stop trigger is turned Off via line 61 (Fig. 1C) which thus produces minus at terminal 7, which is applied via lead 237 to the grid 1 of switch 235 thereby to block the positive pulses from lead 236 passing through switch 235 and stop the primary ring. Prior to initiation of another calculation, the primary ring is reset, as described above.

"A" and "B" pulses

The source of high speed pulses used throughout the calculator comprises circuits which will now be described. A multivibrator of the MV–1 type (Fig. 5) and labeled 240 (Fig. 1D) is provided as the source of these pulses. This multivibrator, as previously stated, produces approximately square topped pulses at its output terminal 9. Since this output of the multivibrator is not a true square wave, means are provided to shape the pulses into a square wave. This is done by means of triode clippers, which utilize only a portion of the waveform from the multivibrator to produce perfect square waves, all in a manner described in the above-identified Palmer et al. patent.

Figure 1D:
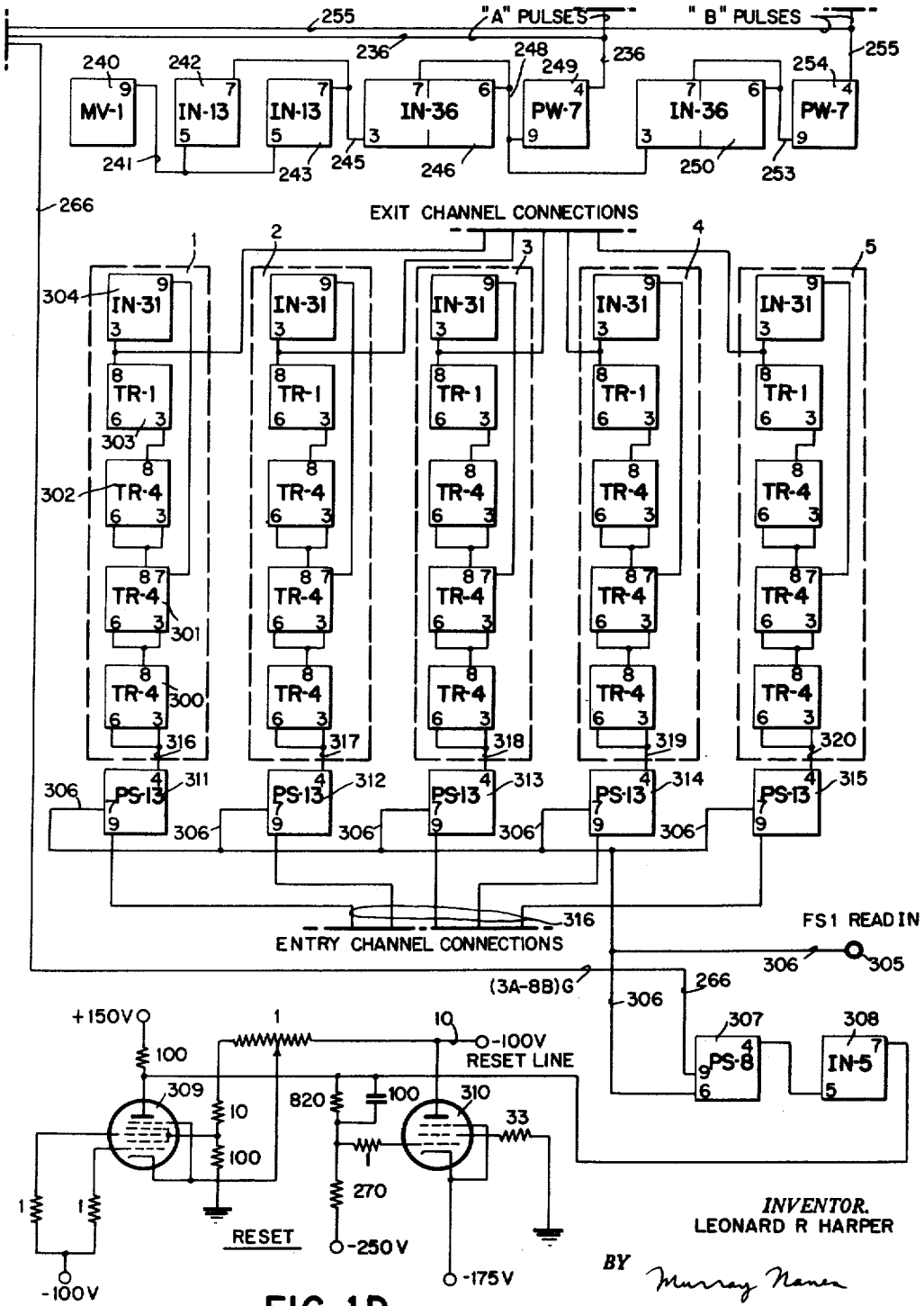
Figure 2:
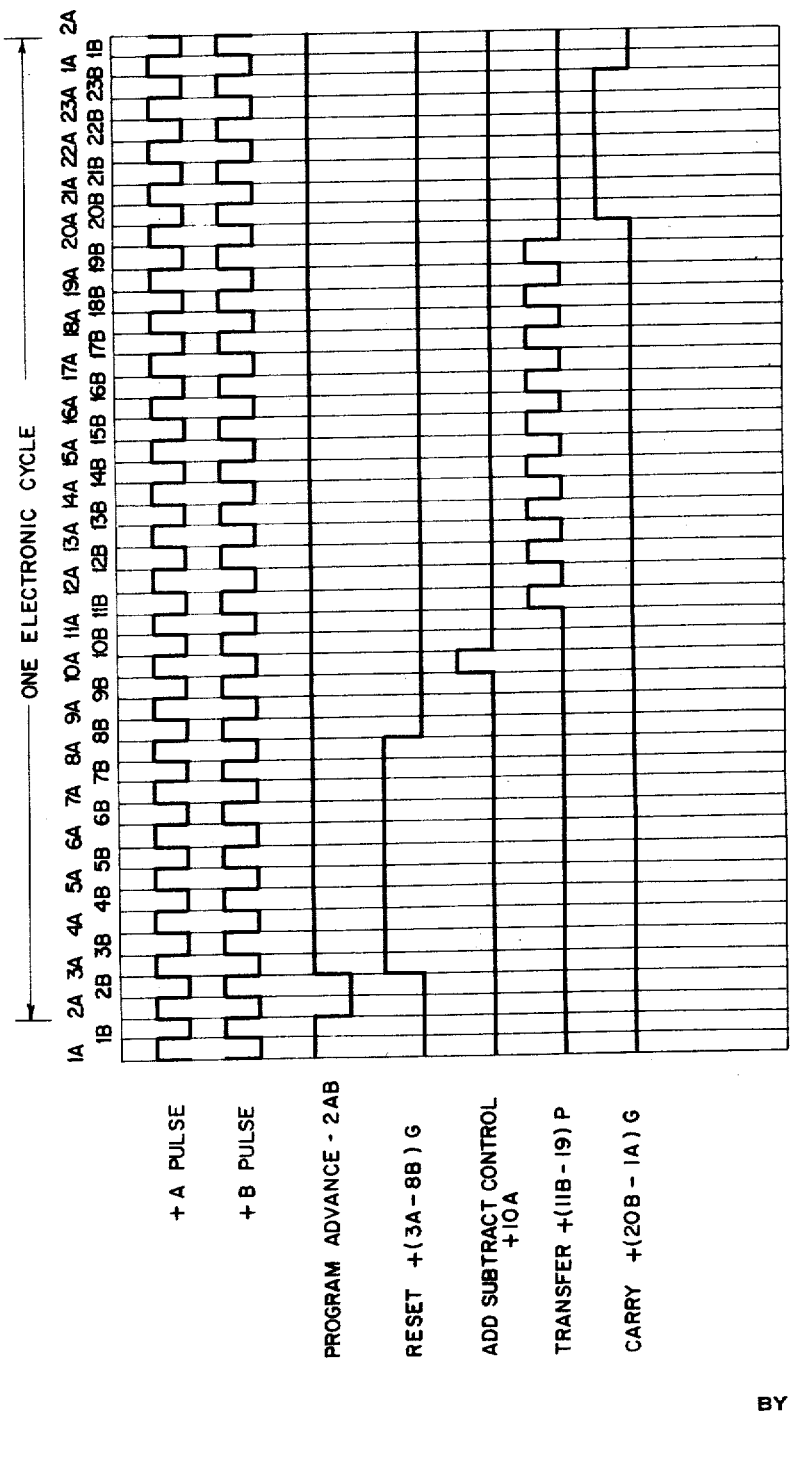
Fig. 2 is a timing chart illustrating primary timer pulses and the timing of sub-program operation pulses.

For the proper operation of the calculator, it is necessary to have two pulse sources, which supply a series of so-called "A" pulses at the rate of 50 kilocycles and a series of so-called "B" pulses, which are produced at the same rate, but 180° out of phase with the "A" pulses, these being illustrated diagrammatically in Fig. 2. Fig. 1D illustrates the necessary circuits for generating these "A" and "B" pulses. The operation is as follows:

The output terminal 9 of multivibrator 240 (Fig. 1D) is connected, in parallel, via a lead 241, to two IN–13 type inverters 242 and 243, respectively, having commonly connected input and output terminals. This parallel connection of inverters is known as the first clipper. The output of the first clipper is fed, via lead 245, to a second clipper, which comprises a type IN–36 inverter 246 (see also Fig. 23). The commonly connected outputs of this second clipper 246 are connected, via lead 248, both to a PW–7 type power tube 249 (see also Fig. 6) and another IN–36 type, third clipper 250. The commonly connected outputs of this third clipper 250 are connected, via a lead 253, to another PW–7 type power tube 254.

The input to the first clipper 242 and 243 is derived from the output of the multivibrator 240 and each time a negative pulse appears at the input of the first clipper 242 and 243, a negative pulse also appears at the output of the second clipper 246 and a positive pulse appears at the output of the third clipper 250, and obviously, with an initial positive pulse, the reverse is true.

Both the second and third clippers are capacitively coupled (see Fig. 6) to the normally conducting power tubes 249 and 254. Since such normally conducting tubes will recognize only negative pulses, the first power tube 249 will produce a positive output pulse only when the output of the clipper 246 goes negative, and the power tube 254 will produce a positive output pulse, only when the output of the clipper 250 goes negative. The pulses produced by the first power tube at a lead 236, are known as "A" pulses, while the pulses produced by the second power tube at a lead 255 are known as "B" pulses. It is thus apparent that each time the input to the first clipper 242 and 243 goes negative, an "A" pulse is produced and that likewise each time the first clipper 242 and 243 input goes positive, a "B" pulse is produced. The timing of these "A" and "B" pulses is shown in Fig. 2. At 50 kc. operation, the "A" pulses always occur first and the "B" pulses always occur next.

Pulse notation and primary cycle

As has been previously described, the home position of the primary timer ring is "step 1" (Fig. 1A), while the last position is "step 23" (Fig. 1C). Each time the primary timer returns to "step 1," one cycle of operation is completed. Thus, if no steps are skipped, a group of 23 successive pulses constitutes one electronic cycle, known as the primary cycle. Each such cycle of the calculator can thus be considered to be divided into 23 cycle points. Thus, when the primary timer is reset to normal, the calculator is at "1." When trigger "step 2" is On, the calculator is at 2, and when trigger "step 12" is On, the calculator is at 12, etc.

In order to simplify electronic timing terminology, a reference notation has been set up which uses the suffixes "A" and "B." As previously described, "A" pulses are always produced first, at the input of the first clipper 242 and 243 (Fig. 1D), and "B" pulses are always produced next. Therefore, as can be seen in Fig. 2, between successive "A" pulses, there is always a "B" pulse.

Since the primary timer is advanced by "A" pulses, each step may be suffixed by the letter "A," to refer to a particular cycle point. Thus, when the primary timer is reset to normal, the calculator is said to be at 1A. Then, as can be seen in Fig. 2, the next "A" pulse advances the timer to 2A, etc. Between 1A and 2A, there is a "B" pulse known as 1B, and between 2A and 3A, there is a pulse 2B, etc.

A pulse lasting from the beginning "A" pulse to the beginning of the next "A" pulse is called an AB pulse. An AB pulse, therefore, includes both an "A" and a "B" pulse. Since the primary timer advances on successive "A" pulses, any one step will be On, from the receipt of one "A" pulse until the receipt of the next "A" pulse. Consequently, the primary timer advances in AB steps and the primary timer ring triggers produce AB pulses. The On sides of the ring triggers produce −AB pulses, while the Off sides produce +AB pulses. All pulse notations are preceded by a plus or minus sign to indicate whether the pulse is a positive pulse or a negative pulse.

The term "gate" is used to signify a duration, from one cycle point to another. A positive gating pulse, lasting from 3A to 8B is abbreviated +(3A–8B)G. A train of pulses is suffixed by the letter P rather than G. Thus, a series of +B pulses occurring between 11B and 19B is abbreviated +(11B–19B)P.

Primary timer controlled pulses

Various gating pulses and trains of pulses are developed, under control of the primary timer as is described in detail in said above mentioned Palmer et al patent. These gates and pulses control sub-program operations within the program functions. Briefly, the more pertinent sub-program operations will be summarized here.

When primary timer trigger "step 2," goes On, its terminal 7 goes positive and applies a +2AB pulse via lead 258 (Fig. 1A) to one input of a type PS–2 pentagrid switch 259. The other input terminal of pentagrid switch 259 at lead 260 is positive at all times except during Multiplication and Division because it is connected to the multiplication and division circuit as described in said Palmer et al. patent. Switch 259, therefore, acts to invert the +2AB pulse and applies it via lead 261 to a CF–5 type cathode follower 262 which increases the power of this now −2AB pulse and applies it to the line 65 where, as described above, it is used for advancing the program ring. Thus, it can be seen that every time primary timer trigger "step 2" goes On, the program ring advances one step except during Multiplication and Division at which time the primary timer ring may go through many cycles without advancing the program ring. The −2AB pulse for Program Advance is shown in the timing diagram, Fig. 2.

A +(3A–8B)G pulse, called a "gate," as stated above, is used in the electronic Reset circuit. The circuit for producing this gate is shown in Fig. 1B and comprises a TR–4 type trigger 265 feeding to an output lead 266 from where the +(3A–8B)G pulse is available. This trigger is turned On, at 3A time by the trigger "step 3" via a lead 267 and an inverter 268 via lead 269 and is turned Off by a —8B pulse produced by the trigger "step 8" via lead 270 and switch 271 via lead 272. This —8B pulse is produced by mixing, in switch 271, a +8AB pulse, from the Off side of the primary timer trigger "step 8" via lead 270, and +B pulses, fed to switch 271 via lead 255. The +(3A–8B)G pulse for Reset is shown in timing diagram (Fig. 2).

A circuit for developing a +(10A) pulse (Fig. 1B) comprises an inverter 275, on the output lead 276 of which the +(10A) pulse is produced. Inverter 275 is fed a —10A pulse via line 277 from a switch 278 where the pulse is produced by mixing a +10AB pulse from the right hand output of trigger "step 10" via lead 279, and +A pulse fed to switch 278 via lead 236. This +(10A) pulse is used for Add-Subtract control and is shown in Fig. 2.

A circuit for developing a train of pulses to be used for Transfer operations, and labeled +11B–19B)P is shown in Fig. 1B comprising an inverter 280 on the output line 281 of which these pulses are produced. To produce these pulses, a +(11A–20A) gate must be developed by a trigger 282. This trigger 282 is turned On at 11A time by the trigger "step 11" via a lead 283 and is turned Off at 20A time by trigger "step 20" via a line 284 and an inverter 285 via a lead 286. This +(11A–20A) gate is fed from trigger 282 via a lead 287 to a switch 288 where it is mixed with +B pulses from lead 255 to produce —(11B–19B) pulses which are fed via a lead 289 to the inverter 280. These +(11B–19B) pulses are used for Transfer operations and are shown in Fig. 2.

A +(20B–1A) gate is used in the Carry circuit and is produced at an output lead 291 (Fig. 1C) of a trigger 292 which is turned On by a —20B pulse produced by the trigger "step 20" via lead 284 and a switch 294 via lead 295. The —20B pulse is produced by mixing in switch 294, a +20AB pulse from the right hand output of trigger "step 20" via lead 284 and +B pulses, fed to switch 294 via lead 255. Trigger 292 is turned Off by the trigger "step 1" via a lead 296. The +(20B–1A) gate for Carry is shown in the timing diagram, Fig. 2.

These gates and pulses are available, at the times described, to control the order of the sub-program operations within a program step. During this electronic cycle, the sub-program operations occur in the given order, Reset, Add-Subtract Control, Transfer, Carry and Program Advance. This order can only be varied to skip either Reset or Carry.

If the particular program function plugged to the program requires a Reset operation, this Reset is controlled by the +(3A–8B) gate and occurs after the new program step is initiated. During this Reset time, either a storage unit or the accumulator may be reset. The program ring is advanced at 2AB time, as has been described, and this might be considered the beginning of the program step. Actually, the first sub-program operation which actually performs part of the program function (arithmetic step) is the Reset operation which starts at 3A time, and it will be considered as the first sub-program operation.

An example of the Reset operation will be given by describing the Resetting of a storage unit FS1 (Fig. 1D). Storage unit position 1 includes four cascade connected triggers 300 to 303 interconnected by means of an inverter 304 to produce certain feedbacks, whereby the normal binary cascade operation is altered to decade operation. Storage unit positions 2 to 5 have similar elements and connections. To reset the storage unit, a positive Reset pulse must be applied to the Reset terminal 4 of each of the triggers (see Figs. 9 and 11 for example) to turn all the triggers Off. This pulse must be of sufficient duration to ensure that none of the triggers will be turned On by another going Off, and that is why a +(3A–8B) gate is used.

The Reset circuit is illustrated in Fig. 1D. Upon application of a positive voltage, from any program "exit" hub via a plugwire (not shown) to a FS–1 Read-In hub labeled 305 in Fig. 1D, this positive voltage is applied via a lead 306 to terminal 6 of a PS–8 type switch 307 to condition its grid 1, so that the +(3A–8B)G "gate" received over lead 266 will cause switch 307 to conduct which applies a pulse to an inverter 308 which then acts on the Reset circuit comprising the multigrid tube 309 and the pentode 310, as described in said Palmer et al. patent, to cause the —100 volt Reset line 10, to rise to ground potential. This relatively positive pulse is applied, to all the Reset terminals of General Storage GS1 triggers to reset the triggers Off, as described above. All the other controls in the sub-program operations, such as Add-Subtract Control, Transfer, and Carry, are described in said Palmer et al. patent and it is only necessary to briefly describe them here, in order to understand this invention.

During Add-Subtract control time, the +(10A)P is used as described in said Palmer et al. patent to make a determination as to whether the factor being read into the accumulator should be entered in True or in Complement form.

During the Transfer portion of the cycle, electronic Transfer between the storage units and the accumulator or vice versa, takes place, and the +(11B–19B)P pulses are used, in combination with a gate controlled by the Add-Subtract control to select the required number of pulses to be transferred as described in said Palmer et al. patent. As an example, going back to the same FS1 Read-In function, which was discussed for Reset, it can be seen that the FS1 Read-In hub 305 is connected via leads 306 to all the input terminals 7 of the switches 311 to 315 which are the Read-In gates. The input terminals 9 of the switches 311 to 315 are connected via leads 316 to the entry channel of the calculator. When the FS1 Read-In hub becomes positive, it conditions the switches 311 to 315 so that the selected +(11B–19B) pulses can be Transferred from the Entry Channel via the Read-In gates 311 to 315 and leads 316 to 320 respectively to the five orders of FS1.

All Carry operations in the accumulator take place during the Carry portion of the cycle, (20B–1A) time, as described in said Palmer et al. patent.

*Primary timer ring control*

Means were described for causing the primary timer ring to selectively operate without skipping, or to operate by skipping triggers "step 3" to "step 8" inclusive which was then shown to be Reset time, or to operate by skipping triggers "step 20" to "step 23," shown to be Carry time. It will now be shown that in order for the primary timer ring to operate without skipping, a No-Skip line 330 (Figs. 1A, 1B and 1C) must be made positive. To skip Reset time, a line 331 must be made positive, while to skip Carry time a line 332 must be made positive. Only one of the lines 330, 331 or 332 is made positive at any one time.

Lead 330 is connected via leads 335, 336, 337 and 338 to the one of the inputs of the respective "Or–2" type "Or" circuits 339, 340, 341 and 342. Lead 331 is connected via lead 343 to the other input of "Or" circuit 339, and via lead 344 to the other input of "Or" circuit 342. Lead 332 is connected via lead 345 to the other input of "Or" circuit 340, and via lead 346 to the other input of "Or" circuit 341. The outputs of "Or" circuits 339, 340, 341 and 342 are respectively connected via leads 347, 348, 349 and 350 respectively to the resistance inputs of the diode gates 196, 172, 181 and 187. Lead 332 is also connected via a lead 351 directly to the resistance input of diode gate 189, and lead 331 is connected via a lead 352 directly to the resistance input of diode gate 174.

As has been previously shown, when either input of an "Or-2" type "Or" circuit is positive, its output is positive. Thus, when lead 330 goes positive, the input leads 335 to 339 inclusive of "Or" circuits 339 to 342 inclusive, respectively, go positive and apply a positive potential via the output leads 347 to 350 inclusive to condition the resistance input terminals of diode gates 196, 172, 181 and 187 respectively. The operation of the primary timer ring is now as follows: The ring advances from trigger "step 1" directly to trigger "step 2" and when trigger "step 2" goes Off, a negative pulse is applied via leads 170 and 171 to the diode input of diode gate 172 which is one of the diode gates conditioned because of the lead 330 going positive. As has been previously described, when the resistance input of a diode gate is conditioned positive and a negative pulse is applied to the diode input of the diode gate, the condenser output terminal goes sharply negative. This sharp negative pulse at the condenser output of diode gate 172 is applied via lead 176 to turn On trigger "step 3." The primary timer ring then advances step by step to trigger "step 8," and when trigger "step 8" goes Off its output terminal goes negative applying a negative voltage via lead 180 to the diode input of diode gate 181. Diode gate 181 has been conditioned by the lead 330 being positive, and, therefore, the sharp negative output pulse is fed from its condenser output terminal via leads 182 and 177 to turn On trigger "step 9." The primary timer ring then advances in steps through to trigger "step 19." When trigger "step 19" goes Off, its right hand output terminal goes negative and applies this negative pulse via leads 185 and 186 to the diode input of the diode gate 187 which has also been conditioned by lead 330 being positive. Diode gate 187 then has a negative output which is fed via lead 192 to the right hand input of trigger "step 20," turning it On. The ring then advances in steps to trigger "step 23." When trigger "step 23" goes Off, its right hand output terminal goes negative and feeds a positive pulse via lead 195 to the diode input of diode gate 196 which has been conditioned by lead 330 being positive. Therefore, a negative output pulse from the condenser output terminal of diode gate 196 is fed via lead 197 and 193 to turn On trigger "step 1." It can thus be seen that when lead 330 is positive, the primary timer ring goes through a complete cycle without skipping any steps.

When lead 331 goes positive, the input leads 343 and 344 respectively of "Or" circuits 339 and 342 go positive and respectively apply a positive potential via the output leads 347 and 350 respectively to condition the resistance input terminals of diode gates 196 and 187. Lead 331 also applied a positive potential via lead 352 to condition the resistance input of the diode gate 174. With lead 331 positive, the operation of the primary timer ring is now as follows: The ring advances from the trigger "step 1" directly to trigger "step 2" and when trigger "step 2" goes Off, a negative potential is applied via leads 170 and 173 to the diode input of the gate 172, since diode gate 172 is not conditioned at this time, there will be no output to turn On trigger "step 3." Instead the negative pulse to the diode input of conditioned diode gate 174, will permit a negative pulse from the condenser output terminal to pass via lead 177 to turn On trigger "step 9." The ring now advances directly step by step to trigger "step 19." When trigger "step 19" goes Off, a negative potential from its right hand output terminal is applied via lead 185 and 186 to the diode input of the conditioned diode gate 187. The output of diode gate 187 is a negative pulse which is fed via lead 192 to turn On trigger "step 20." The ring then advances step by step to trigger "step 23." When trigger "step 23" turns Off, the positive output is fed via line 195 to the diode input of diode gate 196 which is also conditioned at this time. The diode gate 196 thus emits a negative pulse which is fed via lead 197 and 193 to turn On trigger "step 1." It can thus be seen that when lead 331 is positive, the primary timer ring will make a complete cycle except that it will skip trigger "step 3" to trigger "step 8," which is Reset time.

When lead 332 is positive, the input leads 345 and 346 to "Or" circuits 340 and 341 respectively go positive and apply a positive potential via the output leads 348 and 349 respectively to condition the resistance input terminals of diode gates 172 and 181. At the same time, a positive potential is applied from lead 332 via lead 351 to condition the resistance input of diode gate 189. Thus, when lead 332 is positive, diode gates 172, 181 and 189 are conditioned and the primary timer ring then operates as follows: The ring advances from trigger "step 1" directly to trigger "step 2" and when trigger "step 2" goes Off, a negative potential is applied via leads 170 and 171 to the diode input of diode gate 172 which is one of the diode gates conditioned by leads 332 being positive. It is here to be noted that a positive pulse is also applied via lead 173 to the diode input of diode gate 174 which, however, is not conditioned at this time, and, therefore, there will be no output from diode gate 174 to turn On trigger "step 9." Diode gate 172, however, emits a negative output which is fed via lead 172 to turn On trigger "step 3." The ring then advances step by step to trigger "step 8." When trigger "step 8" goes Off, a negative pulse is emitted from its right hand output terminal and fed via lead 180 to the diode input of the conditioned diode gate 181. The output of diode gate 181 is a negative pulse which is fed via leads 182 and 187 to turn On trigger "step 9." The ring advances step by step until trigger "step 19" goes Off at which time a positive pulse is applied via lead 185 and 186 to the diode input of conditioned diode gate 189. It is here to be noted that even though a positive pulse is applied to the diode input of diode gate 187, since the resistance input of diode gate 187 is not conditioned, there is no output from its condenser output terminal to turn On trigger "step 20." Instead, diode gate 189 has a negative pulse at its condenser output which is fed via leads 193 to turn On trigger "step 1." It is thus seen that with lead 332 positive, the ring makes a complete cycle except that it skips trigger "step 20" to "step 23" inclusive, which comprises Carry time.

*Program functions*

Fig. 4 shows a listing of the program functions (arithmetic steps) and the sub-program operations necessary for carrying out said program function. Group 1 comprises the first cycle of the program functions, Multiply +, Multiply — and Divide. Since these three program functions require the same sub-program operations, they will be considered together and referred to as M—D (first cycle); M—D being an abbrebiation of Multiply and Divide.

From Fig. 4, it can be seen that the calculator, during M—D (first cycle), requires time for Reset, Add-Subtract control, Transfer, and Carry, but does not need Program Advance. Thus, the Program Advance step at 2AB time could be skipped during M—D (first cycle) but since it is only one step of the primary timer, it was felt that the time saved by skipping this step did not warrant the extra circuitry that would be needed. Reset time is necessary on M—D (first cycle) because of the possibility that the Accumulator will have to be Reset before Multiplication and the MQ unit Reset before Division. Since no primary timer steps are to be skipped during M—D (first cycle), means will presently be shown for making line 330 (Fig. 1) positive during M—D (first cycle) to effect a complete cycle of the primary timer ring.

Group II comprises the intermediate cycle of the program functions Multiply +, Multiply —, and Divide, referred to as M—D (int. cycle). M—D (int. cycle) is similar to M—D (first cycle) except that Reset time is not necessary. Means will presently be shown for making line 331 (Figs. 1A, 1B and 1C) positive during the M—D (int. cycle) to effect the skipping of the Reset time portion of the primary timer ring.

Group III comprises M—D (last cycle) and ACC RI+ and ACC RI—, and is similar to Group II except that time is required for Program Advance. Since, as previously described, Program Advance time was not skipped for Group II, Group III is thus treated similarly to Group II and means will be shown for making line 331 positive during Group III operations to effect skipping of Reset time only.

Group IV comprises Read-In to storage, including FS RI, GS RI and MQ RI. In any Read-In to Storage as previously mentioned, Reset is necessary but since the number is only stored there, a Carry operation is not necessary. All the other sub-program operations are necessary, and means will be shown for making line 332 positive during Group IV operations to effect skipping of the Carry time portion of the primary timer ring.

Group V comprises Read-Out to Accumulators and Storage and includes ACC RO, ACC RO and Reset, FS RO, GS RO, and MQ RO, all of which require no Reset and no Carry operation time. (ACC RO and Reset requires a reset time in the following cycle.) It would thus appear that the primary timer ring could be made to operate so as to skip both Reset and Carry time when Group V is called for. However, further study reveals that every time Read-Out for some unit is desired, simultaneously Read-In to another unit must occur. If there is to be ACC RI, Carry must occur, and if this is to be Storage RI, Reset must occur. Therefore, the circuit is designed so that Group V does not control the selection of which of the lines 330, 331 and 332 are to be made positive to effect skipping, but control of the selection depends on the particular Read-In function being used.

*Selection control*

Program function hubs are shown in Fig. 1A, and three of these, Mult +, Mult — and the Div. hubs (M—D hubs) are shown connected via leads 360, 361 and 362 respectively, to the three inputs of an OR-11 type "Or" circuit 363, whose output is connected via a lead 364 to the right hand input of a TR-2 type M—D trigger 365. If any of these M—D hubs are made positive (by connecting them to a Program hub) the output "Or" circuit 363 at lead 364 will go negative at 2A time and turn On M—D trigger 365. The left hand input M—D trigger 365 is connected via a lead 366 to a means which supplies a negative pulse at the end of both Multiply and Divide, a means which is described in said Palmer et al. patent.

Thus, the M—D trigger 365 goes On at the start and goes Off at the end of Multiply or Divide.

As has been described, on M—D (first cycle), no skipping in the primary timer ring is required, while on M—D (int. cycle) and M—D (last cycle) skipping of Reset time is required. Means will now be shown for getting one lead (lead 330) positive on M—D (first cycle) and another lead (lead 331) positive for M—D (int. cycle) and M—D (last cycle).

When M—D trigger 365 goes On at the beginning of M—D (2A time), its left hand output becomes negative and this negative shift is applied via a lead 367 to the right hand input of a TR-2 type trigger 368 to turn it On. The left hand input of trigger 368 is connected via a lead 369 to the left hand output of primary timer trigger "step 1." When the primary timer ring goes through a complete cycle and trigger "step 1" is turned On, a negative pulse is applied via lead 369 to turn Off trigger 368 which has thus been On only during the first cycle of M—D. The left hand output of trigger 368 is therefore — on M—D (first cycle). This negative voltage is fed via a lead 370 to the input of an IN-4 inverter 371 where it is inverted and becomes + on M—D (first cycle) which is fed to the lead 330 to be used to effect "no skipping" of the primary timer ring.

The left hand output of M—D trigger 365 is also connected via a lead 373 to one input of an &-5 type "And" circuit 374. The right hand output of trigger 368 is connected via a lead 375 to the other input of "And" circuit 374. Lead 373 will be — on M—D while lead 375 will be + on M—D (first cycle). Thus, it can be seen that the two input leads 373 and 375 will both be negative only during all the cycle of M—D except the first and, therefore, the output of "And" circuit 374 will be + on M—D (int. cycle) and + on M—D (last cycle). This voltage is applied via a lead 376, a CF-6 type cathode follower 377, and a lead 378 to one of the inputs of an "OR-3" type "Or" circuit 379.

The two other inputs to "Or" circuit 379 are respectively connected via leads 381 and 382 to an ACC RI+hub and an ACC RI—hub. If any one of the inputs to "Or" circuit 379 goes positive, the output at lead 331 goes positive to effect skipping of Reset as previously described.

In Fig. 1A, storage Read-In hubs, FS1 RI, FS2 RI, GS1 RI, GS2 RI, and MQ RI are shown as connected via leads 385 to 389 respectively to an "OR-3" type "Or" circuit 390. The "OR-3" type "Or" circuit is shown with five inputs, but as previously described, more inputs can be used, and thus other factor storage and general storage Read-In hubs also can be connected to it. "Or" circuit 390 has its output lead connected to the lead 332 and if any of the storage Read-In hubs are programmed, a positive potential will be applied one of the inputs of "Or" circuit 390 and the output at lead 332 will go positive to effect skipping of Carry as previously described.

All the program function hubs just described are also connected (via leads not shown) to other parts of the calculator to effect the performance of their respective program functions as described in said Palmer et al. patent. The Read-Out program function hubs, Group V, ACC RO, ACC RO and Reset, FS RO, GS RO and MQ RO are not shown in the drawings and are connected in no way to leads 330, 331 and 332 because, as previously described, it is the Read-In functions which control the selection of the primary timer ring skipping, rather than the Read-Out functions.

There has, therefore, been described novel means for producing skipping in an electronic ring and means for using the skipping means to produce more rapid calculating.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a calculator, means to store factors, means to compute results from said factors, including accumulator means to store said results, a commutator, reset means coupled to a first section of the commutator, said reset means when conditioned selectively reset said store means and said accumulator means, transfer means coupled to a second section of the commutator for transferring factors between said store means and said accumulator means, carrying means coupled to a third section of the commutator, said carry means when conditioned perform carry operations in said accumulator means, a plurality of program function means each of which when actuated selectively conditions said reset means and said carry means, said commutator sections being operative to actuate the transfer means and the conditioned reset means and carry means, and means under control of the program function means for skipping the commutator sections associated with the unconditioned reset means and carry means.

2. A device comprising, in combination a ring of bistable elements arranged in groups, the elements in each group being connected together for sequential operation when pulsed, first and second gating devices, said first gating device connected between the last bistable element in each group and the first bistable element in the next adjacent group, said second gating devices connected between the last bistable element in each group and the first bistable element in some group other than the next adjacent group, said first and second gating devices operating when conditioned to provide operative connections between the bistable elements to which they are connected, a chain of bistable elements operated step by step by the operation of one of said ring groups, a plurality of select lines, means under control of the chain elements for activating a selected one of said select lines, first OR means coupling a plurality of the select lines to said first gating devices, means coupling some of the select lines to said second gating devices, wherein said selected activated select line conditions its associated gating devices, and means for pulsing simultaneously said bistable elements.

3. A device comprising, in combination, a ring of bistable elements arranged in groups, the elements in each group being connected together for sequential operation when pulsed, first and second gating devices, each said gating device comprising a diode, a resistance and a condenser, said diode, resistance and condenser commonly connected at one end, means connecting the last element in each group to the other end of the diode of each of said first and second gating devices, means connecting the other end of the condenser of each of said first gating devices to the first bistable element in the next adjacent group, means connecting the other end of the condenser of said second gating devices to the first bistable element in some group other than the next adjacent group, said first and second gating devices operating when conditioned to provide operative connections between the bistable elements to which they are connected, a chain of bistable elements operated step by step by the operation of one of said ring groups, a plurality of select lines, means under control of the chain elements for activating a selected one of said select lines, first OR means coupling a plurality of the select lines to the resistances of said first gating devices, means coupling some of the select lines to the resistances of said second gating devices, wherein said selected activated select line conditions the associated gating device, and means for pulsing simultaneously said bistable elements.

4. In a calculator adapted to solve problems through the performance of successively programmed arithmetic steps, a program system comprising, in combination, a plurality of sub-program means arranged in a fixed order, each of which when actuated controls the performance of a particular portion of an arithmetic step in a problem to be solved by said calculator, a plurality of program function means, each of which, when actuated, controls the performance of a particular arithmetic step in a problem, a commutator, means coupling individual sections of the commutator to individual sub-program means, said commutator sections normally operative in sequence to actuate their associated sub-program means, means for determining which sub-program means are unnecessary to perform a particular type of arithmetic step, settable stepping means for actuating the program function means, and means under control of said last mentioned means and said determining means for selectively skipping the commutator sections associated with the sub-program means which are unnecessary to perform the particular arithmetic step.

5. In a calculator adapted to solve problems through the performance of successively programmed arithmetic steps, a program system comprising, in combination, a plurality of sub-program means arranged in a fixed order, each of which when actuated controls the performance of a particular portion of an arithmetic step in a problem to be solved by said calculator, a plurality of program function means, each of which, when actuated, controls the performance of a particular arithmetic step in a problem, a source of pulses, a ring of bistable elements, said ring of elements arranged in groups, each grouping connected to a sub-program means, circuit means electronically connected to said ring for applying said pulses to initiate sequential individual operations of said bistable elements, said elements when operated, actuating the sub-program means to which they are respectively connected, means for determining which sub-program means are unnecessary to perform a particular type of arithmetic step, settable stepping means for actuating the program function means and means under control of said last mentioned means and said determining means for selectively skipping groups of elements of said ring associated with the sub-program means which are unnecessary to perform the particular arithmetic step.

6. In a calculator adapted to solve problems through the performance of successively programmed arithmetic steps, a program system comprising, in combination, a plurality of sub-program means, each of which when actuated controls the performance of a particular portion of an arithmetic step in a problem to be solved by said calculator, a commutator, means coupling individual sections of the commutator to individual sub-program means, a plurality of program function means, each of which, when actuated, controls the performance of a particular arithmetic step in the problem by conditioning the commutator sections for actuation, only those commutator sections being conditioned which are associated with the sub-program means necessary to perform the particular arithmetic step, means for determining which sub-program means are unnecessary to perform a particular type of arithmetic step, means for selectively actuating the program function means, and means under control of the last mentioned means and said determining means for operating each conditioned commutator section in sequence, the unconditioned commutator sections associated with the sub-program means unnecessary to perform the particular arithmetic step being skipped.

7. In a calculator as in claim 6 wherein said section operating means comprises a plurality of gating means connected to the section before said section to be skipped, and means coupling individual gating means to the section to be skipped and the section to be skipped to.

8. In a calculator as in claim 7 wherein said program function means for conditioning the commutator sections includes a plurality of select lines, means for activating a selected one of said select lines dependent upon the particular arithmetic step being performed, means coupling said select lines to said gating means, wherein said selected activated select lines conditions its associated gating means.

9. In a calculator adapted to solve problems through the performance of successively programmed arithmetic steps, a program system comprising, in combination, a plurality of sub-program means, each of which, when actuated controls the performance of a particular portion of an arithmetic step in a problem to be solved by said calculator, a source of pulses, a ring of bistable elements, the elements of said ring arranged in groups, each group connected to an associated sub-program means, a plurality of program function means, each of which, when actuated, controls the performance of a particular arithmetic step in the problem by conditioning the ring groups for element operation, only those groups being conditioned which are associated with the sub-program means necessary to perform a particular arithmetic step, means for determining which sub-program means are unnecessary to perform a particular type of arithmetic step, means for selectively actuating the program function means, and means under control of the program function means for initiating sequential individual operations of the bistable elements of the conditioned ring groups in sequence, the unconditioned ring groups associated with the sub-program means unnecessary to perform the particular arithmetic step being skipped.

10. In a calculator as in claim 9 wherein said group operation initiating means comprises a plurality of gating means connected to the group before said group to be skipped, and means coupling individual gating means to the group to be skipped and the group to be skipped to.

11. In a calculator as in claim 10 wherein said program function means for conditioning the commutator section includes a plurality of select lines, means for activating a selected one of said select lines dependent upon the particular arithmetic step being performed, means coupling said select lines to said gating means, wherein said select activated select lines conditions its associated gating means.

12. In a calculator adapted to solve problems through the performance of successively programmed arithmetic steps, a program system comprising, in combination, a plurality of sub-program means, each of which, when actuated, controls the performance of a particular portion of an arithmetic step in a problem to be solved by said calculator, a chain of bistable elements individually operable to an On or Off condition, said bistable elements of the chain connected in groups to individual ones of said sub-program means, only one of said bistable elements being in an On condition at any time, the bistable elements when in the On condition actuating the sub-program means to which their group is connected, a plurality of gating means, means connecting the last bistable element of the chain groups to a pair of said gating means, means coupling one of each pair of gating means to the first bistable element of the succeeding chain group and the other one of the pair to the chain group following said succeeding group in said chain, means connected to the bistable element and the gating means for normally stepping the On condition from each bistable element in a group to its succeeding bistable element in sequence, means for determining which sub-program means are unnecessary to perform a particular type of arithmetic step, a plurality of program function means, each of which, when actuated, controls the performance of a particular arithmetic step in a problem by selectively conditioning for actuation one of each pair of gating means permitting the first bistable element in the group associated with its conditioned gating means to be turned On by said stepping means when the last bistable element connected to said pair of gating means goes Off, only those gating means being conditioned which are connected to the bistable element group associated with the sub-program means necessary to perform the particular arithmetic step, the bistable element group connected to the unconditioned gating means associated with the sub-program means unnecessary to perform the particular arithmetic step being skipped.

13. In a calculator, means to store factors, means to compute results from said factors including accumulator means to store said results, a commutator, reset means coupled to a first section of the commutator, said reset means when conditioned selectively resetting said accumulator means, transfer means coupling to a second section of the commutator for transferring factors between said store means and said accumulator means, carry means coupling to a third section of the commutator, said carry means performing carry operations in said accumulator means, a plurality of program function means, each of which, when actuated, selectively conditions said reset means, said commutator sections being operative to actuate the transfer means and carry means and the conditioned reset means, and means under control of the program function means to skip the commutator section associated with the unconditioned reset means.

14. In a calculator, means to store factors, means to compute results from said factors, including accumulator means to store said results, a commutator, reset means coupled to a first section of the commutator, said reset means resetting said accumulator means, transferring means coupled to a second section of the commutator for transferring factors between said store means and said accumulator means, carry means coupled to a third section of the commutator, said carry means, when conditioned, forming carry operations in said accumulator means, a plurality of program function means, each of which, when actuated, selectively conditions said carry means, said commutator section being operative to actuate the transfer means and the reset means and the conditioned carry means, and means under control of the program function means for selectively skipping the commutator section associated with the unconditioned carry means.

References Cited in the file of this patent

UNITED STATES PATENTS

| | | |
|---|---|---|
| 2,623,171 | Woods-Hill et al. | Dec. 23, 1952 |
| 2,686,299 | Eckert | Aug. 10, 1954 |
| 2,731,203 | Miles | Jan. 17, 1956 |

FOREIGN PATENTS

| | | |
|---|---|---|
| 1,056,750 | France | Oct. 21, 1953 |
| 736,144 | Great Britain | Sept. 7, 1955 |
| 709,407 | Great Britain | May 26, 1954 |

OTHER REFERENCES

Burkes: "Electronic Computing Circuits of the ENIAC," Proc. IRE, August 1947, pp. 756–767.

M. V. Wilkes: "The EDSAC—An Electronic Calculating Machine," Journal of Scientific Instruments, December 1949, pp. 385–391.

Pinkerton: "A Short Description of the EDSAC Type Calculator Circuits Used in LEO," Lyons & Co., Ltd., Aug. 7, 1951 (pages 7–9 and Figs. 502–504, 5–6 and 519 relevant).